US012777227B1

(12) United States Patent
Rakshit et al.

(10) Patent No.: US 12,777,227 B1
(45) Date of Patent: Oct. 27, 2026

(54) MEDIA CONTENT CLASSIFICATION AND MANAGEMENT IN A CONTENT DELIVERY NETWORK

(71) Applicant: International Business Machines Corporation, Armonk, NY (US)

(72) Inventors: Sarbajit Kumar Rakshit, Kolkata (IN); Sathya Santhar, Chennai (IN); Sridevi Kannan, Chennai (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/236,074

(22) Filed: Jun. 12, 2025

(51) Int. Cl.
*H04N 21/466* (2011.01)
*H04N 21/231* (2011.01)
*H04N 21/845* (2011.01)

(52) U.S. Cl.
CPC ... *H04N 21/4665* (2013.01); *H04N 21/23106* (2013.01); *H04N 21/8456* (2013.01)

(58) Field of Classification Search
CPC ......... H04N 21/4665; H04N 21/23106; H04N 21/8456
See application file for complete search history.

(56) References Cited

U.S. PATENT DOCUMENTS 11,418,769 B1 8/2022 Taghavi Nasrabadi et al.

FOREIGN PATENT DOCUMENTS

EP 1410215 A1 4/2004

OTHER PUBLICATIONS

Adapting Your CDN to Accommodate Various Media Types, CacheFly.com, Oct. 8, 2024, 11 pages, Link: https://www.cachefly.com/news/adapting-your-cdn-to-accommodate-various-media-types/.
CDN Optimization for Dynamic Content Delivery, Medium.com, May 5, 2016, 11 pages, Link: https://medium.com/@datapath_io/cdn-optimization-for-dynamic-content-delivery-c8bfeabe3e7c.
Designing a Content Delivery Network (CDN), Linkedin.com, Mar. 27, 2024, 9 pages, doi: https://www.linkedin.com/pulse/designing-content-delivery-network-cdn-cloudastra-technologies-rfk9c.
Method and System for Enhancing Areas of Interest in Volumetric Video with GAN, IP.com, IPCOM000271669, Jan. 27, 2023, 4 pages, Link: https://priorart.ip.com/IPCOM/000271669.
(Continued)

*Primary Examiner* — Anthony Bantamoi
(74) *Attorney, Agent, or Firm* — CHIP LAW GROUP

(57) ABSTRACT

Media content classification and management in a content delivery network is provided and includes obtaining media content from a first set of electronic devices. A set of segments is extracted from the media content. Each segment of the set of segments is classified into a first set of segments or a second set of segments based on an application of a first ML model. A set of cache refresh intervals is determined based on an application of a second ML model. The second set of segments is stored on a second set of electronic devices based on the set of cache refresh intervals. The first set of segments and the second set of segments are aggregated by the second set of electronic devices based on an application of a third ML model to generate aggregated content. The aggregated content is outputted by the second set of electronic devices.

20 Claims, 11 Drawing Sheets

(56) References Cited

OTHER PUBLICATIONS

Serhan Gul et al., "Cloud rendering-based volumetric video streaming system for mixed reality services", MMSys '20: Proceedings of the 11th ACM Multimedia Systems Conference, May 27, 2020, 4 pages, Link: https://dl.acm.org/doi/10.1145/3339825.3393583.

Srujan Thomdapu et al., "Dynamic cache management in content delivery networks", Computer Networks, Jan. 19, 2021, 16 pages, doi: //www.sciencedirect.com/science/article/abs/pii/S1389128621000116.

800

MEDIA CONTENT CLASSIFICATION AND MANAGEMENT IN A CONTENT DELIVERY NETWORK

BACKGROUND

The disclosure relates to media content and more particularly, to management of the media content.

Media content corresponds to a diverse array of formats and structures including text, audio, video, images, interactive multimedia elements, and specialized formats like volumetric content, 2-D videos, and 3-D videos, each offering unique experiences used to convey information and engage audiences. While 2-D videos provide traditional flat visuals and 3-D videos add depth, volumetric content captures three-dimensional representations allowing viewers to navigate and interact with the scene as if physically present. The integration of these media types facilitates immersive experiences across industries like entertainment, education, virtual reality (VR), augmented reality AR, and telepresence, supporting interactive storytelling, realistic simulations, and engaging interactions between virtual elements and real-world contexts, ultimately enriching the audience's experience.

SUMMARY

In various embodiments of the disclosure, a computer-implemented method for media content classification and management in a content delivery network is described. The computer-implemented method further includes applying, by a computer in a first time interval, a first machine learning (ML) model of a set of ML models on each segment of a set of segments of media content. The media content is associated with a first set of electronic devices. The computer-implemented method further includes classifying, by the computer in the first time interval, each segment of the set of segments into one of a first set of segments or a second set of segments based on the applying of the first ML model to each segment of the set of segments. Each segment of the first set of segments corresponds to a streamable segment and each segment of the second set of segments corresponds to a cacheable segment. The computer-implemented method further includes applying, by the computer in the first time interval, a second ML model of the set of ML models on the second set of segments. The computer-implemented method further includes determining, by the computer in the first time interval, a set of cache refresh intervals associated with the second set of segments based on the applying of the second ML model to the second set of segments. The computer-implemented method further includes storing, by the computer in the first time interval, each segment of the second set of segments on a second set of electronic devices based on the determined set of cache refresh intervals. The second set of electronic devices is different from the first set of electronic devices. The computer-implemented method further includes controlling, by the computer in a second time interval, the second set of electronic devices to obtain the first set of segments from the first set of electronic devices. The second time interval is subsequent to the first time interval. The computer-implemented method further includes controlling, by the computer in the second time interval, the second set of electronic devices to aggregate the obtained first set of segments with the second set of segments based on an application of a third ML model to the obtained first set of segments and the second set of segments. The computer-implemented method further includes generating, by the computer, aggregated content based on the aggregation of the obtained first set of segments with the second set of segments. The computer-implemented method further includes controlling, by the computer in the second time interval, the second set of electronic devices to output the aggregated content.

In various embodiments of the disclosure, a computer system for media content classification and management in a content delivery network is described. The computer system includes a processor set, one or more computer-readable storage media, and program instructions stored on the one or more computer-readable storage media. The program instructions further cause the processor set to apply, in a first time interval, a first machine learning (ML) model of a set of ML models on each segment of a set of segments of media content. The media content is associated with a first set of electronic devices. The program instructions further cause the processor set to classify, in the first time interval, each segment of the set of segments into one of a first set of segments or a second set of segments based on the application of the first ML model to each segment of the set of segments. Each segment of the first set of segments corresponds to a streamable segment and each segment of the second set of segments corresponds cacheable segment. The program instructions further cause the processor set to apply, in the first time interval, a second ML model of the set of ML models on the second set of segments. The program instructions further cause the processor set to determine, in the first time interval, a set of cache refresh intervals associated with the set of the second set of segments based on the application of the second ML model to the second set of segments. The program instructions further cause the processor set to obtain, in the first time interval, device data associated with each electronic device of the first set of electronic devices and a second set of electronic devices based on the determination of the set of cache refresh intervals. The second set of electronic devices is different from the first set of electronic devices. The program instructions further cause the processor set to configure, in the first time interval, a content delivery network (CDN) including the first set of electronic devices and the second set of electronic devices based on the obtained device data. The program instructions further cause the processor set to transmit, in the first time interval, the second set of segments from the first set of electronic devices to the second set of electronic devices based on the configuration of the CDN. The program instructions further cause the processor set to control, in the first time interval, the second set of electronic devices to store each segment of the transmitted second set of segments. The program instructions further cause the processor set to control, in a second time interval, the second set of electronic devices to obtain the first set of segments from the first set of electronic devices. The second time interval is subsequent to the first time interval. The program instructions further cause the processor set to control, in the second time interval, the second set of electronic devices to aggregate the obtained first set of segments with the stored second set of segments based on an application of a third ML model to the obtained first set of segments and the stored second set of segments. The program instructions further cause the processor set to generate, in the second time interval, aggregated content based on the aggregation of the obtained first set of segments with the stored second set of segments. The program instructions further cause the processor set to control, in the second time interval, the second set of electronic devices to output the aggregated content.

In various embodiments of the disclosure, a computer-program product for a classification and management of media content is described.

Additional technical features and benefits are realized through the techniques of the disclosure. Embodiments and aspects of the disclosure are described in detail herein and are considered a part of the claimed subject matter. For a better understanding, refer to the detailed description and the drawings.

BRIEF DESCRIPTION OF THE DRAWINGS

The following description will provide details of preferred embodiments with reference to the following figures wherein.

DETAILED DESCRIPTION

Figure 1:
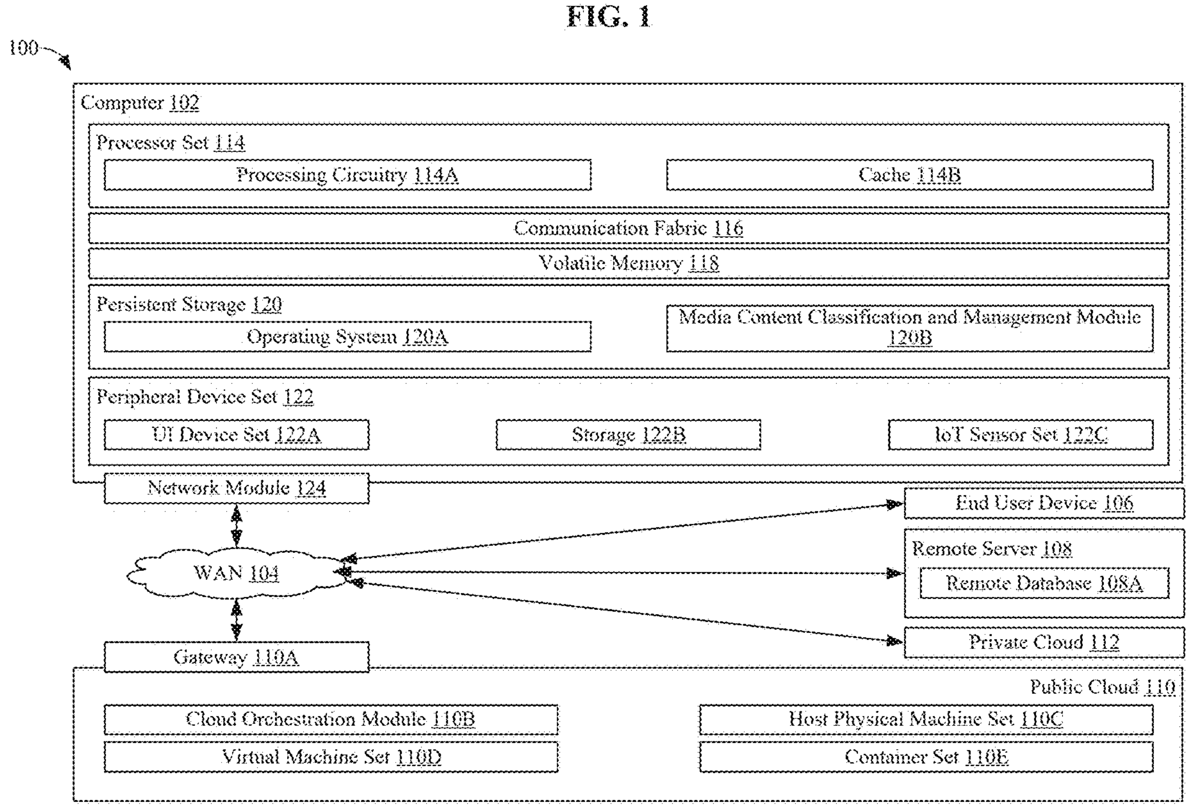
FIG. 1 is a diagram that illustrates a computing environment for media content classification and management in a content delivery network, in accordance with an embodiment of the disclosure.

In various embodiments of the disclosure, a computer-implemented method for media content classification and management in a content delivery network is described. The computer-implemented method further includes applying, by a computer in a first time interval, a first machine learning (ML) model of a set of ML models on each segment of a set of segments of media content. The media content is associated with a first set of electronic devices. The computer-implemented method further includes classifying, by the computer in the first time interval, each segment of the set of segments into one of a first set of segments or a second set of segments based on the applying of the first ML model to each segment of the set of segments. Each segment of the first set of segments corresponds to a streamable segment and each segment of the second set of segments corresponds to a cacheable segment. The computer-implemented method further includes applying, by the computer in the first time interval, a second ML model of the set of ML models on the second set of segments. The computer-implemented method further includes determining, by the computer in the first time interval, a set of cache refresh intervals associated with the second set of segments based on the applying of the second ML model to the second set of segments. The computer-implemented method further includes storing, by the computer in the first time interval, each segment of the second set of segments on a second set of electronic devices based on the determined set of cache refresh intervals. The second set of electronic devices is different from the first set of electronic devices. The computer-implemented method further includes controlling, by the computer in a second time interval, the second set of electronic devices to obtain the first set of segments from the first set of electronic devices. The second time interval is subsequent to the first time interval. The computer-implemented method further includes controlling, by the computer in the second time interval, the second set of electronic devices to aggregate the obtained first set of segments with the second set of segments based on an application of a third ML model to the obtained first set of segments and the second set of segments. The computer-implemented method further includes generating, by the computer, aggregated content based on the aggregating of the obtained first set of segments with the second set of segments. The computer-implemented method further includes controlling, by the computer in the second time interval, the second set of electronic devices to output the aggregated content. The computer-implemented method classifies the set of segments into one of the first set of segments or a second set of segments based on the application of the first ML model to each segment of the set of segments based on user engagement data and the rate of temporal changes. The classification informs decisions about which segment of the media content should be cached on the second set of electronic devices, the refresh intervals for that cache, and which segments are to be streamed directly to the user. By understanding how users are likely to interact with different segments of the media content, the system can proactively manage data distribution, ensuring that the most relevant content is readily available while minimizing network load. The disclosed method reduces bandwidth consumption by caching the segments as per user engagement, which reduces the number of requests to an origin server of the first set of electronic devices.

In various embodiments of the disclosure, the computer-implemented method further includes obtaining, by the computer, in the first time interval, the media content from the first set of electronic devices. The computer-implemented method further includes extracting, by the computer in the first time interval, the set of segments from the media content.

In various embodiments of the disclosure, the media content corresponds to one of a volumetric video, a three-dimensional (3D) video, or a two-dimensional (2D) video, and wherein each electronic device of the first set of electronic devices corresponds to an origin server. The computer-implemented method includes various types of media content allowing the various fields to leverage different types of media content to deliver the content in a content delivery network with reduced bandwidth consumption. And restricting the kind of media content to become a constraint in the smooth content delivery. The computer-implemented method further includes the origin server as an electronic device of the first set of electronic devices. The origin server is the server storing the media content. The origin server provides a single source of truth allowing security and integrity in the content delivery network. The origin server reduces the latency in the network due to its distance from a set of users. In various embodiments of the disclosure, the computer-implemented method further includes receiving, by the computer in the first time interval, user engagement data associated with the media content. The computer-implemented method further includes applying, by the computer in the first time interval, the first ML model to each segment of the set of segments and the user engagement data. The computer-implemented method further includes classifying, by the computer in the first time interval, each segment of the set of segments into one of the first set of segments or the second set of segments based on the applying of the first ML model to each segment of the set of segments and the user engagement data. Each segment of the set of segments is classified, in accordance with a rate of temporal changes, in the media content of a respective segment of the set of segments. The computer-implemented method applies the first ML model to categorize the set of segments of the media content into the first set of segments and the second set of segments. The classification is based on user engagement data and the rate of temporal changes within each segment. By applying the first ML model, the system determines which segments should be cached on a second set of electronic devices, optimizing content availability and reducing network traffic. By analyzing user interaction patterns with different segments of the media content, the system can anticipate and manage data distribution proactively and make the most relevant content readily accessible, minimizing the need for frequent requests to the origin server associated with the first set of electronic devices. As a result, the method effectively reduces bandwidth consumption by caching segments based on user engagement, thereby decreasing the number of requests to the origin server and enhancing overall network efficiency.

In various embodiments of the disclosure, the first ML model includes a convolutional neural network (CNN) model, and a long short-term memory (LSTM) model. The computer-implemented method includes the first ML model as a combination of the CNN and the BiLSTM model which allows complex classification. The CNN model is adept at extracting spatial hierarchies of features, making the first ML model ideal for identifying patterns in the segments of the media content. And LSTM excels at capturing temporal dependencies and sequential information. By integrating these models, the first ML model can handle complex media content (such as volumetric content) efficiently, leading to improved accuracy and robustness.

In various embodiments of the disclosure, the second ML model corresponds to a deep-Q network (DQN). The second ML model is trained on historical user engagement data associated with the media content or historical media content. The computer-implemented method includes the DON network that predicts the set of cache refresh intervals based on the historical user engagement data associated with the media content or historical media content. The DQN model allows accurate predictions of what action should be taken associated with each segment of the set of segments of the media content. The set of cache refresh intervals prevents storage wastage by ensuring that outdated data is replaced efficiently. The refreshment of cache data reduces processing load by eliminating the need to repeatedly process cacheable content from the central cloud, as the cacheable content can now be retrieved directly from local caches.

In various embodiments of the disclosure, the computer-implemented method further includes transmitting, by the computer in the first time interval, the second set of segments to the second set of electronic devices based on the set of cache refresh intervals. Each segment of the second set of segments is stored on at least one electronic device of the second set of electronic devices, for a respective cache refresh interval of the set of cache refresh intervals. The computer-implemented method includes the transmission of the second set of segments to the second set of electronic devices based on the set of cache refresh intervals. The cache refresh interval associated with each segment of the second set of segments allows an update in the second set of segments, which enhances the quality of the media content and the user experience.

In various embodiments of the disclosure, the computer-implemented method further includes obtaining, by the computer in the first time interval, device data associated with each electronic device of the first set of electronic devices and the second set of electronic devices. The computer-implemented method further includes configuring, by the computer in the first time interval, a content delivery network (CDN) including the first set of electronic devices and the second set of electronic devices based on the device data. The computer-implemented method further includes transmitting, by the computer in the first time interval, the second set of segments from the first set of electronic devices to the second set of electronic devices based on the configuring of the CDN. The computer-implemented method includes the configuration of the CDN. The CDN allows low cost of bandwidth utilization due to the presence of edge servers in various geographical locations. The CDN provides the fast delivery of content due to the capability of caching data on the edge servers. The transmission of cacheable content to the second set of devices allows better response time and reduces low bandwidth consumption.

In various embodiments of the disclosure, the computer-implemented method further includes applying, by the computer in the first time interval, a fourth ML model of the set of ML models on the device data. The fourth ML model is a graph neural network (GNN) based model. The computer-implemented method further includes configuring, by the computer in the first time interval, the CDN based on the applying of the fourth ML model to the device data. The computer-implemented method includes the application of the GNN model to configure the CDN model. The GNN model obtains the device data associated with the first set of electronic devices and the second set of electronic devices. The GNN model creates a graph having nodes as the first set of electronic devices and the second set of electronic devices and paths as a connection between the first set of electronic devices and the second set of electronic devices. The GNN model determines the efficient path for content transmission throughout the CDN network, which reduces latency and increases the response time of the system described in the disclosed method.

In various embodiments of the disclosure, each electronic device of the second set of electronic devices corresponds to an edge server of the CDN. Edge servers store the cacheable content and reduce the response time and the latency of the CDN. Edge servers increase reliability.

In various embodiments of the disclosure, the computer-implemented method further includes controlling, by the computer in the second time interval, the second set of electronic devices to output the aggregated content. The output of the aggregated content corresponds to a storage of the aggregated content on the edge server of the CDN. The storage of the second set of segments on the edge servers allows caching of the content. The cacheable content can be stored and retrieved when needed. The storage of the second set of segments on the edge server allows easy updates based on the cache refresh interval associated with each segment of the second set of segments.

In various embodiments of the disclosure, each electronic device of the second set of electronic devices corresponds to an end-user device associated with an end-user. The end-user device of the second set of electronic devices allows the user to retrieve the media content from the first set of electronic devices and the second set of electronic devices.

In various embodiments of the disclosure, the computer-implemented method further includes controlling, by the computer in the second time interval, the second set of electronic devices to output the aggregated content. The output of the aggregated content corresponds to a rendering of the aggregated content on the end-user device. The end-user device renders the aggregated content as the final output. The end-user device aggregates the first set of segments and the second set of segments allowing an error-free media content rendering.

In various embodiments of the disclosure, the third ML model corresponds to a generative adversarial network (GAN). The GAN model allows the aggregation of the first set of segments and the second set of segments to generate the aggregated content. A generator network of the GAN model generates the aggregated content and a discriminator network evaluates the aggregated content on the media content to match the realism and correctness of the aggregated content, allowing accurate and error-free transmission.

In various embodiments of the disclosure, a cache refresh interval from the set of cache refresh intervals associated with a corresponding segment of the second set of segments corresponds to a time period after which the corresponding segment is updated on an electronic device from the second set of electronic devices. Each cache refresh interval of the set of cache refresh intervals is associated with each segment of the second set of segments. The set of cache refresh intervals allows the updating of the second set of segments stored at the edge servers to ensure the relevant and updated segments of the second set of segments to be delivered to the user.

In various embodiments of the disclosure, a computer system for media content classification and management in a content delivery network is described. The computer system includes a processor set, one or more computer-readable storage media, and program instructions stored on the one or more computer-readable storage media. The program instructions further cause the processor set to apply, in a first time interval, a first machine learning (ML) model of a set of ML models on each segment of a set of segments of media content. The media content is associated with a first set of electronic devices. The program instructions further cause the processor set to classify, in the first time interval, each segment of the set of segments into one of a first set of segments or a second set of segments based on the application of the first ML model to each segment of the set of segments. Each segment of the first set of segments corresponds to a streamable segment and each segment of the second set of segments corresponds cacheable segment. The program instructions further cause the processor set to apply, in the first time interval, a second ML model of the set of ML models on the second set of segments. The program instructions further cause the processor set to determine, in the first time interval, a set of cache refresh intervals associated with the set of the second set of segments based on the application of the second ML model to the second set of segments. The program instructions further cause the processor set to obtain, in the first time interval, device data associated with each electronic device of the first set of electronic devices and a second set of electronic devices based on the determination of the set of cache refresh intervals. The second set of electronic devices is different from the first set of electronic devices. The program instructions further cause the processor set to configure, in the first time interval, a content delivery network (CDN) including the first set of electronic devices and the second set of electronic devices based on the obtained device data. The program instructions further cause the processor set to transmit, in the first time interval, the second set of segments from the first set of electronic devices to the second set of electronic devices based on the configuration of the CDN. The program instructions further cause the processor set to control, in the first time interval, the second set of electronic devices to store each segment of the transmitted second set of segments. The program instructions further cause the processor set to control, in a second time interval, the second set of electronic devices to obtain the first set of segments from the first set of electronic devices. The second time interval is subsequent to the first time interval. The program instructions further cause the processor set to control, in the second time interval, the second set of electronic devices to aggregate the obtained first set of segments with the stored second set of segments based on an application of a third ML model to the obtained first set of segments and the stored second set of segments. The program instructions further cause the processor set to generate, in the second time interval, aggregated content based on the aggregation of the obtained first set of segments with the stored second set of segments. The program instructions further cause the processor set to control, in the second time interval, the second set of electronic devices to output the aggregated content. The computer system classifies the set of segments into one of the first set of segments or a second set of segments based on the application of the first ML model to each segment of the set of segments based on user engagement data and the rate of temporal changes. The classification informs decisions about which segment of the media content should be cached on the second set of electronic devices, the refresh intervals for that cache, and which segments are to be streamed directly to the user. By understanding how users are likely to interact with different segments of the media content, the system can proactively manage data distribution, ensuring that the most relevant content is readily available while minimizing network load. The disclosed method reduces bandwidth consumption by caching the segments as per user engagement, which reduces the number of requests to an origin server of the first set of electronic devices.

In various embodiments of the disclosure, the program instructions further cause the processor set to receive, in the first time interval, user engagement data associated with the media content. The program instructions further cause the processor set to apply, in the first time interval, the first ML model to each segment of the set of segments and the user engagement data. The program instructions further cause the processor set to classify, in the first time interval, each segment of the set of segments into one of the first set of segments or the second set of segments based on the application of the first ML model to each segment of the set of segments and the user engagement data. Each segment of the set of segments is classified, in accordance with a rate of temporal changes, in the media content of a respective segment of the set of segments. The computer system applies the first ML model to categorize the set of segments of the media content into the first set of segments and the second set of segments. The classification is based on user engagement data and the rate of temporal changes within each segment. By applying the first ML model, the system determines which segments should be cached on a second set of electronic devices, optimizing content availability and reducing network traffic. By analyzing user interaction patterns with different segments of the media content, the system can anticipate and manage data distribution proactively and make the most relevant content readily accessible, minimizing the need for frequent requests to the origin server associated with the first set of electronic devices. As a result, the method effectively reduces bandwidth consumption by caching segments based on user engagement, thereby decreasing the number of requests to the origin server and enhancing overall network efficiency.

In various embodiments of the disclosure, the program instructions further cause the processor set to transmit, in the first time interval, the second set of segments to the second set of electronic devices based on the determination of the set of cache refresh intervals. Each segment of the second set of segments is stored on at least one electronic device of the second set of electronic devices, for a respective cache refresh interval of the set of cache refresh intervals. The computer system includes the transmission of the second set of segments to the second set of electronic devices based on the set of cache refresh intervals. The cache refresh interval associated with each segment of the second set of segments allows an update in the second set of segments, which enhances the quality of the media content and the user experience.

In various embodiments of the disclosure, the program instructions further cause the processor set to control in the second time interval, the second set of electronic devices to output the aggregated content. The output of the aggregated content corresponds to a storage of the aggregated content on an edge server of the CDN. The storage of the second set of segments on the edge servers allows caching of the content. The cacheable content can be stored and retrieved when needed. The storage of the second set of segments on the edge server allows easy updates based on the cache refresh interval associated with each segment of the second set of segments.

In various embodiments of the disclosure, a computer-program product for media content classification and management in a content delivery network is described. The computer program product includes one or more computer-readable storage media and program instructions stored in the one or more computer-readable storage media to perform operations that include applying in a first time interval, a first machine learning (ML) model of a set of ML models on each segment of a set of segments of the media content. The media content is associated with a first set of electronic devices. The computer-implemented method further includes classifying in the first time interval, each segment of the set of segments into one of a first set of segments or a second set of segments based on the application of the first ML model to each segment of the set of segments. Each segment of the first set of segments corresponds to a streamable segment and each segment of the second set of segments corresponds to a cacheable segment. The computer-implemented method further includes applying in the first time interval, a second ML model of the set of ML models on the second set of segments. The computer-implemented method further includes determining in the first time interval, a set of cache refresh intervals associated with the second set of segments based on the application of the second ML model to the second set of segments. The computer-implemented method further includes storing in the first time interval, each segment of the second set of segments on a second set of electronic devices based on the determined set of cache refresh intervals. The second set of electronic devices is different from the first set of electronic devices. The computer-implemented method further includes controlling in a second time interval, the second set of electronic devices to obtain the first set of segments from the first set of electronic devices. The second time interval is subsequent to the first time interval. The computer-implemented method further includes controlling in the second time interval, the second set of electronic devices to aggregate the obtained first set of segments with the second set of segments based on an application of a third ML model to the obtained first set of segments and the second set of segments. The computer-implemented method further includes generating aggregated content based on the aggregation of the obtained first set of segments with the second set of segments. The computer-implemented method further includes controlling in the second time interval, the second set of electronic devices to output the aggregated content. The computer program product classifies the set of segments into one of the first set of segments or a second set of segments based on the application of the first ML model to each segment of the set of segments based on user engagement data and the rate of temporal changes. The classification informs decisions about which segment of the media content should be cached on the second set of electronic devices, the refresh intervals for that cache, and which segments are to be streamed directly to the user. By understanding how users are likely to interact with different segments of the media content, the system can proactively manage data distribution, ensuring that the most relevant content is readily available while minimizing network load. The disclosed method reduces bandwidth consumption by caching the segments as per user engagement, which reduces the number of requests to an origin server of the first set of electronic devices.

Media content encompasses specialized formats like volumetric content, 2-D videos, and 3-D videos. Volumetric video is a video capture technique that records a three-dimensional representation of a scene or a subject, enabling viewers to interact with the content as if the viewers were physically present. The technology of volumetric video captures a continuous stream of depth information through the use of multiple cameras or depth-sensing technologies like Light detection and ranging (LiDAR), allowing for the reconstruction of a subject's shape, movement, and appearance from various angles. The resulting 3D model provides a richer and more immersive viewing experience across diverse applications, including entertainment, education, virtual reality (VR), and augmented reality (AR). In these fields, volumetric video enhances storytelling and learning by allowing users to explore environments dynamically. For instance, in entertainment, media content can create interactive experiences where audiences can engage with performances from multiple perspectives, while in education, media content facilitates immersive simulations that enhance understanding and retention of complex concepts.

Volumetric content represents a transformative approach to media creation and consumption, as the volumetric content encapsulates not just visual elements but also spatial and contextual information that allows for a more engaging user experience. Volumetric content is characterized by its ability to convey depth, movement, and interaction. By capturing the full three-dimensional essence of a subject or environment, volumetric content enables users to navigate and explore scenes from multiple angles, fostering a sense of presence and immersion. The interactivity of volumetric content is particularly valuable in applications such as gaming, where players can engage with the environment dynamically, or in virtual tours of real estate and museums, where prospective buyers or visitors can experience spaces as if the players were physically there. As the demand for more immersive experiences continues to grow, the development and distribution of volumetric content will likely expand, leading to innovations in storytelling, education, and training methodologies that leverage rich mediums to captivate audiences in unprecedented ways.

A Content Delivery Network (CDN) allows the transmission of volumetric content by distributing volumetric content across a network of geographically dispersed servers. The architecture of CDN allows CDNs to cache copies of volumetric video closer to end-users, reducing latency and improving load times. When a user requests a volumetric stream, the CDN directs the users to the nearest server containing the cached content, ensuring swift delivery and a smooth viewing experience. Furthermore, CDNs employ adaptive bitrate streaming techniques that dynamically adjust the quality of the video based on real-time network conditions and user device capabilities. The adaptability of CDN is particularly for volumetric content, which requires substantial bandwidth due to its complex data structure. Leading CDN providers also incorporate advanced security measures such as encryption and access control to protect against piracy and unauthorized access, thereby maintaining content integrity while delivering high-quality immersive experiences.

Existing systems for volumetric video primarily focus on capturing and rendering three-dimensional content but often face challenges in efficiently managing the significant data volume needed for transmission. Current technologies utilize multiple cameras to capture various viewpoints simultaneously, stitching the viewpoints together to create a cohesive 3D representation. While these systems can deliver impressive visual experiences, the existing systems typically rely heavily on network bandwidth to transmit the large amounts of spatial and depth data involved, resulting in reduced video quality and playback interruptions during network fluctuations. The reliance on network bandwidth also leads to increased latency due to delays in transmitting and processing data in the cloud, especially during real-time interactions. The immense raw data generated results in the wastage of storage resources as redundant or overlapping information is stored inefficiently. Additionally, heightened computational load arises from the intensive rendering and decoding processes needed for volumetric content, which demand significant processing power and often strain both cloud servers and end-user devices. Moreover, the existing systems need significant network bandwidth to transmit high-resolution textures and depth information, which places additional strain on network infrastructure and exacerbates challenges in bandwidth-constrained environments.

Despite having the capability of transmitting the media content, existing volumetric video systems lack the efficiency needed to optimize network resources when delivering content to multiple clients. Current content delivery systems struggle with high latency and congestion due to the inability of the existing systems to predict and adapt to user engagement patterns in real-time. As a result, there is a need for solutions that can dynamically classify volumetric content for caching purposes. Combining caching strategies with streaming techniques ensures a seamless experience for users while minimizing the demands on network infrastructure.

The disclosed system addresses the challenges of delivering high-quality volumetric content by managing network resources and optimizing the user experience. The system begins by classifying volumetric content based on predicted user engagement patterns, change frequencies, and potential viewing directions. By analyzing historical data and real-time interactions, the system can identify which sections of the volumetric content are likely to attract user attention and how frequently these sections change. The classification informs decisions about which portions of the content should be cached on edge servers, the refresh intervals for that cache, and which sections are to be streamed directly to the client. By obtaining only streamable content and storing cacheable content locally on the edge servers, the system reduces network bandwidth usage significantly, as only the streamable content needs to be streamed from the central cloud, and cache content is available on edge servers. Cached data is refreshed based on predetermined refresh rates, preventing storage wastage by ensuring that outdated data is replaced efficiently. Based on the cache refresh intervals, the cacheable content is stored on the edge servers and the streamable content is streamed directly from the central cloud. The refreshment of cache data reduces processing load by eliminating the need to repeatedly process cacheable content from the central cloud, as the cacheable content can now be retrieved directly from local caches. Additionally, the processing time for the classification and management of media content is reduced as only streamable content needs to be fetched from the central cloud in real-time, and the cacheable content can be directly obtained from the edge servers. By understanding how users are likely to interact with different parts of the volumetric scene, the system proactively manages data distribution, ensuring that the most relevant content is readily available while reducing the network load as cacheable content is obtained from the edge servers rather than the central cloud. The disclosed system not only enhances user satisfaction but also significantly reduces bandwidth consumption.

The disclosed system further enhances content delivery by dynamically creating a Content Delivery Network (CDN) among edge servers and client systems. As users engage with the volumetric content, the viewing directions and angles of the users are continuously tracked, allowing the system to identify areas of interest in real-time, enabling the CDN to adapt dynamically, ensuring that content is delivered from the most appropriate cached sources based on predicted user behavior. Additionally, a Generative Adversarial Network (GAN) on the client-side aggregates cached content and streamed content for seamless presentation. The advanced processing results in smoother transitions between cached and streamed segments, enhancing the overall viewing experience. By predicting changes in user engagement and adjusting cache strategies accordingly, the disclosed system ensures the utilization of network resources while reducing latency significantly. The disclosed system delivers a high-quality, interactive volumetric video experience that meets modern users' demands while accommodating devices with varying processing capabilities and network conditions.

The disclosed system optimizes volumetric content delivery by leveraging predictive analysis of the user engagement patterns and dynamic caching strategies. By classifying volumetric content based on the predicted user engagement patterns and the frequency of changes within different sections, the system ensures that only the most relevant content is cached on edge servers and frequently changing data should be streamed from the central cloud. The disclosed system minimizes data transmission as cacheable content, effectively reducing network congestion and enhancing system performance. The ability to predict user engagement timelines allows the remote cloud-hosted server to manage cache refresh intervals intelligently, ensuring that users receive timely updates without overwhelming the network. Furthermore, by obtaining only streamable content while storing cacheable data locally for refresh cache intervals, processing loads are reduced as redundant computations for transmission of cache-able content are avoided. This proactive management aligns with modern cloud-native principles, promoting responsiveness in volumetric video delivery while reducing bandwidth usage and improving resource utilization across devices and networks.

Moreover, the dynamic creation of a Content Delivery Network (CDN) among edge servers and client systems of the disclosed system enhances its adaptability to varying user demands. By continuously tracking user viewing directions and angles, the disclosed system can adjust content delivery in real-time, optimizing the flow of both cached and streamed volumetric data. The delivery of the content based on the user engagement data ensures user satisfaction and utilizes network bandwidth. The integration of advanced technologies such as Generative Adversarial Networks (GANs) for content aggregation allows the system to deliver immersive experiences with minimal latency. Overall, the disclosed system addresses gaps in traditional volumetric content delivery systems, providing a robust solution that ensures scalability, reduces operational costs, and ensures consistent performance across diverse applications.

Various aspects of the disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks are performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium is an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or various freely propagating electromagnetic waves, electromagnetic waves propagating through a waveguide, light pulses passing through a fiber optic cable, electrical signals communicated through a wire, and/or various transmission media. As will be understood by those of skill in the art, data is typically moved at some occasional points in time during normal operations of a storage device, such as during access, de-fragmentation, or garbage collection, but does not render the storage device as transitory because the data is not transitory while it is stored.

FIG. 1 is a diagram that illustrates a computing environment for prediction and prevention of cybersquatting events, in accordance with various embodiments of the disclosure. With reference to FIG. 1, there is shown a computing environment 100 that contains an example of an environment for the execution of at least some of the computer code involved in performing the disclosed methods, such as media content classification and management module 120B. In addition to the media content classification and management module 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the media content classification and management, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or wearable computer, a mainframe computer, a quantum computer, or any form of a computer or a mobile device now known or to be developed in the future that may run a program, access a network or query a database, such as the remote database 108A. As is well understood in the art of computer technology, and depending upon the technology, the performance of a computer-implemented method may be distributed among multiple computers and/or between multiple locations. Alternatively, in this presentation of the computing environment 100, detailed discussion is focused on a single computer, specifically the computer 102, to keep the presentation as simple as possible. The computer 102 may be located in a cloud, even though the computer 102 is not shown in a cloud in FIG. 1.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in various types of computer-readable storage media, such as the cache 114B and the storage media discussed below. The program instructions, and associated data, are accessed by the processor set 114 to control and direct the performance of the disclosed methods. In computing environment 100, at least some of the instructions for performing the disclosed methods may be stored in the dynamic modification of the media content classification and management module 120B in persistent storage 120.

The communication fabric 116 is the signal conduction path that allows the various components of the computer 102 to communicate. Typically, this fabric is made of switches and electrically conductive paths, such as the switches and electrically conductive paths that make up buses, bridges, physical input/output ports, and the like. Various types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 may be characterized by random access. In the computer 102, the volatile memory 118 may be located in a single package and is internal to the computer 102, but alternatively or additionally, the volatile memory 118 may be distributed over multiple packages and/or located externally with respect to the computer 102.

The persistent storage 120 is any form of non-volatile storage for computers that is now known or to be developed in the future. The non-volatility of this storage means that the stored data is maintained regardless of whether power is being supplied to the computer 102 and/or directly to the persistent storage 120. The persistent storage 120 may be a read-only memory (ROM), but typically at least a portion of the persistent storage 120 allows the writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the media content classification and management module 120B typically includes at least some of the computer code involved in performing the disclosed methods.

The peripheral device set 122 includes the set of peripheral devices of the computer 102. Data communication connections between the peripheral devices and the various components of the computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In some embodiments of the disclosure, storage 122B may take the form of a quantum computing storage device for storing data in the form of qubits. In embodiments of the disclosure where the computer 102 may include an amount of storage (for example, where the computer 102 locally stores and manages a database) then this storage may be provided by peripheral storage devices designed for storing data, such as a storage area network (SAN) that is shared by multiple, geographically distributed computers. The IoT sensor set 122C is made up of sensors that may be used in Internet of Things applications. For example, one sensor may be a thermometer, and one sensor may be a motion detector.

The network module 124 is the collection of computer software, hardware, and firmware that allows the computer 102 to communicate with various computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In various embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods may typically be downloaded to the computer 102 from an external computer or external storage device through a network adapter card or network interface included in the network module 124.

The WAN 104 is any wide area network (for example, the internet) that communicates computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates the computer 102) and may take any of the forms discussed above in connection with the computer 102. The EUD 106 typically receives helpful and useful data from the operations of the computer 102. For example, in a hypothetical case where the computer 102 is designed to provide a recommendation to an end user, this recommendation would typically be communicated from the network module 124 of the computer 102 through WAN 104 to the EUD 106. In this way, the EUD 106 can display, or present recommendations to an end user. In some embodiments of the disclosure, the EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collects and stores helpful and useful data for use by various computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or various computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. Virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in isolated user-space instances. A computer program running on an ordinary operating system can utilize the resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in various embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a hybrid cloud.

Figure 2:
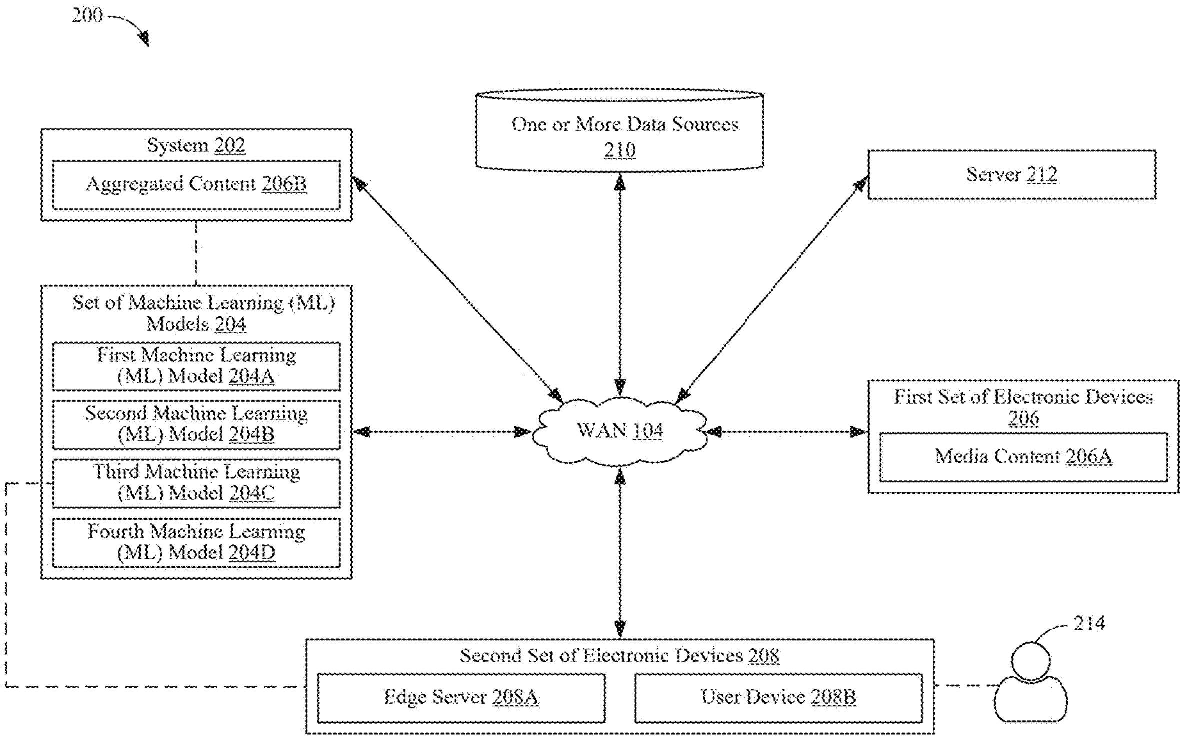
FIG. 2 is a diagram that illustrates a network environment for media content classification and management in a content delivery network, in accordance with an embodiment of the disclosure.

FIG. 2 is a diagram that illustrates a network environment 200 for media content classification and management, in accordance with various embodiments of the disclosure. FIG. 2 is explained in conjunction with elements from FIG. 1. With reference to FIG. 2, there is shown a diagram of a network environment 200. The network environment 200 includes a computer system 202 (may also be referred to as a system 202, hereinafter) and a set of machine learning (ML) models 204. The set of ML models 204 includes a first ML model 204A, a second ML model 204B, a third ML model 204C, and a fourth ML model 204D. The system 202 further includes a first set of electronic devices 206. Each electronic device of the first set of electronic devices 206 may correspond to an origin server from which media content 206A is being generated. In an embodiment, the system 202 is configured to obtain the media content 206A from the first set of electronic devices 206. In an embodiment, the system 202 is further configured to generate aggregated content 206B based on the obtained media content 206A. The system 202 further includes a second set of electronic devices 208. The second set of electronic devices 208 includes an edge server 208A and a user device 208B (may also be referred to as an end-user device, hereinafter). The network environment 200 further includes one or more data sources 210 and a server 212. The second set of electronic devices 208 is further associated with a first entity 214. In various embodiments of the disclosure, the user device 208B may be an exemplary embodiment of the EUD 106. Similarly, the system 202 may be an exemplary embodiment of the computer 102 in FIG. 1.

The system 202 may include suitable logic, circuitry, interfaces, and/or code that may be configured to perform media content classification and management in a content delivery network. In an embodiment, the system 202 may be configured to obtain in a first time interval, the media content 206A from the first set of electronic devices 206. The system may be further configured to extract in the first time interval, a set of segments from the media content 206A. The system 202 may be further configured to apply in the first time interval, the first ML model 204A of the set of ML models 204 on each segment of the set of segments. The system 202 may be further configured to classify in the first time interval, each segment of the set of segments into one of a first set of segments or a second set of segments based on the application of the first ML model 204A to each segment of the set of segments. Each segment of the first set of segments corresponds to a streamable segment and each segment of the second set of segments corresponds to a cacheable segment. The system 202 may be further configured to apply in the first time interval, the second ML model 204B of the set of ML models 204 on the second set of segments. The system 202 may be further configured to determine in the first time interval, a set of cache refresh intervals associated with the second set of segments based on the application of the second ML model 204B to the second set of segments. The system 202 may be further configured to store in the first time interval, each segment of the second set of segments on the second set of electronic devices 208 based on the determined set of cache refresh intervals. The second set of electronic devices 208 is different from the first set of electronic devices 206. The system 202 may be further configured to control in a second time interval, the second set of electronic devices 208 to obtain the first set of segments from the first set of electronic devices 206. The second time interval is subsequent to the first time interval. The system 202 may be further configured to control in the second time interval, the second set of electronic devices 208 to apply the third ML model 204C of the set of ML models 204 to the obtained first set of segments and the second set of segments. The system 202 may be further configured to control in the second time interval, the second set of electronic devices 208 to aggregate the obtained first set of segments with the second set of segments based on the application of the third ML model 204C to the obtained first set of segments and the second set of segments. The system 202 may be further configured to generate the aggregated content 206B based on the aggregation of the obtained first set of segments with the second set of segments. The system 202 may be further configured to control in the second time interval, the second set of electronic devices 208 to output the aggregated content 206B. Examples of the system 202 may include, but are not limited to, a server, a computing device, a virtual computing device, a mainframe machine, a computer workstation, a smartphone, a cellular phone, a mobile phone, a gaming device, or a consumer electronic (CE) device. The first ML model 204A may include a hybrid architecture that integrates Convolutional Neural Networks (CNNs) and Bidirectional Long Short-Term Memory (BiLSTM) networks to process, analyze, and classify volumetric data. The CNN model corresponds to a neural network-based classifier. The neural network is a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons). Outputs of the nodes in the input layer may be coupled to at least one node of the hidden layer(s). Similarly, the inputs of each hidden layer are coupled to outputs of at least one node in various layers of the neural network. Outputs of each hidden layer may be coupled to inputs of at least one node in the various layers of the neural network. Node(s) in the final layer may receive inputs from at least one hidden layer to output a result.

The number of layers and the number of nodes in each layer may be determined from hyper-parameters of the neural network. Such hyper-parameters may be set before or while training the neural network on the training dataset. Each node of the neural network corresponds to a mathematical function (e.g., a sigmoid 2 function or a rectified linear unit) with a set of parameters, tunable during the training of the neural network. The set of parameters includes, for example, a weight parameter, a regularization parameter, and the like. Each node uses the mathematical function to compute an output based on one or more inputs from nodes in various layer(s) (e.g., previous layer(s)) of the neural network. The nodes of the neural network correspond to the same or a different mathematical function.

In the training of the first ML model 204A, one or more parameters of each node of the first ML model 204A may be updated based on whether an output of the final layer for a given input (from the training dataset) matches a correct result based on a loss function for the first ML model 204A. The above process may be repeated for the same or a different input until a minima of loss function may be achieved, and a training error may be minimized. The neural network includes electronic data, such as, for example, a software program, code of the software program, libraries, applications, scripts, or various logics or instructions for execution by a processing device, such as circuitry. The neural network may be implemented using hardware including a processor, a microprocessor (e.g., to perform or control the performance of one or more operations), a field-programmable gate array (FPGA), or an application-specific integrated circuit (ASIC). Alternatively, in some embodiments, the neural network may be implemented using a combination of hardware and software. Accordingly, in some embodiments, the first ML model 204A is a separate entity in the computer system 202, without deviation from the scope of the disclosure.

In an embodiment of the disclosure, the first ML model 204A is configured to identify the first set of errors associated with the first subset of instructions. The computer system 202 trains the first ML model 204A to identify the first set of errors based on the first subset of instructions. The first ML model 204A identifies patterns and relationships between the first subset of instructions and its training data to identify the first set of errors. The first ML model 204A is further configured to resolve the first set of errors. The computer system 202 similarly trains the first ML model 204A to resolve the first set of errors. The first ML model 204A identifies the patterns and relationships between the first set of errors and its training data to resolve the first set of errors.

In an embodiment of the disclosure, the computer system 202 stores the first ML model 204A. In an alternate embodiment of the disclosure, the first ML model 204A is embodied as a separate entity that is implemented as a set of distributed cloud-based resources by use of several technologies that are well known to those ordinarily skilled in the art. Examples of the first ML model 204A include one of but are not limited to, an artificial neural network (ANN), a deep neural network (DNN), a convolutional neural network (CNN), a fully connected neural network, and/or a combination of such networks.

The BiLSTM model in the first ML process analyzes sequential data received from the output layer of the CNN model. The BiLSTM model processes the data in two different passes, a forward pass and a backward pass. The forward pass processes the sequences in the received sequential data from start to end, capturing forward dependencies. The forward pass determines the forward dependencies from the beginning of the sequence data to the end of the sequence data, understanding how earlier parts of the content influence later parts. The backward pass processes sequences, in the sequence data, from end to start, capturing backward dependencies. The backward pass determines the backward dependencies from the end of the sequence data to the beginning of the sequence data, understanding how later parts of the content influence earlier parts. The outputs from the forward and backward LSTMs are concatenated to create a richer, context-aware representation of the content, accounting for dependencies in both directions.

The BiLSTM model utilizes specialized logic gates that manage the flow of information. These gates include the forget gate, which controls how much information is retained from previous time processes; the input gate, which regulates the addition of new information to the memory cell; and the output gate, which determines what information is sent to the subsequent layer. The structure of BiLSTM allows for effective learning by preserving relevant information over long sequences while filtering out noise.

The BiLSTM component within the first ML model 204A enhances its ability to capture contextual dependencies by processing input sequences in both directions. The dual processing allows each component of a sequence to benefit from both past and future context, making BiLSTM particularly effective for tasks such as natural language processing where understanding context is needed. For instance, in analyzing sentences, BiLSTM can differentiate meanings based on surrounding words that precede or follow a target word. The first ML model 204A may incorporate mechanisms for feature extraction from each set of segments of the media content 206A through its CNN component, which captures spatial patterns in each segment of the set of segments of the media content 206A before passing each segment of the set of segments to the BiLSTM network for analysis of the sequential dependencies within the segment of the set of segments.

During the training phase of the first ML model 204A, the parameters of each node are updated based on the performance of the model's output against expected results, as defined by a loss function. The iterative process continues until a minimum loss is achieved, indicating that the model has effectively learned from its training dataset. Various optimization techniques, such as stochastic gradient descent or Adam optimization, may be employed to facilitate the training process and enhance convergence toward parameter values.

The first ML model 204A may also encompass various electronic data components, including software programs, code libraries, and algorithms designed for execution on processing devices like central processing unit (CPU) or graphics processing unit (GPU) clusters. The integration allows the model to leverage advanced computational resources for efficient processing of large datasets. The architecture of the first ML model 204A is designed to enable seamless execution of operations across different computing environments, ensuring scalability and adaptability in various applications.

The system 202 is configured to apply the first ML model 204A on the set of segments associated with the media content 206A. The first ML model 204A classifies the set of segments of the media content 206A into the first set of segments and the second set of segments. Based on the application of the first ML model 204A, the system 202 determines a rate of temporal changes associated with each segment of the set of segments. Further, based on the rate of temporal changes associated with each segment of the set of segments, the system 202 may classify each segment of the set of segments into the first set of segments and the second set of segments. By way of example, and not by limitation, if the media content 206A corresponds to a real-time video streaming of the cricket match, then the set of segments may include three segments such as a first segment including a portion of the real-time video indicating a sky view of a stadium, in which the cricket match is being played, a second segment including a portion of the real-time video indicating an audience view of the stadium, and a third segment including a portion of the real-time video indicating a field view of the stadium. The system 202 determines a slow-changing rate for the sky view of the stadium and a fast-changing rate for the field view based on the application of the first ML model 204A. The system 202 may classify the first segment indicating the sky view as the first set of segments and the third segment indicating the field view as the second set of segments based on the determination of the rate of temporal changes associated with each segment of the set of segments.

The second ML model 204B may correspond to a Deep Q-Network (DQN) architecture designed for reinforcement learning tasks. The second ML model 204B is structured in a series of layers, including an input layer, multiple hidden layers, and an output layer. The input layer receives input data such as cache status associated with the edge server 208A, network load, and the historical user engagement data, which are processed through several hidden layers composed of fully connected neurons. These neurons transform the input data into higher-level features that are more suitable for predicting the expected rewards associated with each possible action. The output layer consists of neurons that correspond to each potential action, providing the estimated Q-values for those actions in the current state. The output layer provides Q-values for the action that needs to be performed based on the historical user engagement data.

Each node within the second ML model 204B may be associated with weights and biases that are adjusted during training to optimize performance. The learning process involves minimizing the difference between predicted Q-values and actual rewards received from the environment, which is facilitated by a loss function (such as Huber loss, mean squared error, double DON loss, or the like). The DQN employs a variant of the Q-learning algorithm to update its parameters based on experience tuples collected during interactions with the environment.

During training, the DON utilizes a technique called experience replay, where past experiences (state, action, reward, next state) are stored in a replay memory, which allows the model to sample random experiences during training, breaking correlations between consecutive experiences and improving learning stability. The architecture supports iterative updates through backpropagation, ensuring that the predicted Q-values converge toward values over time.

The second ML model 204B may also incorporate various electronic data components, including software programs, code libraries, and algorithms designed for execution on processing devices like central processing units (CPU) or graphics processing units (GPU) clusters. The integration enables efficient processing of large datasets and allows the model to leverage advanced computational resources effectively.

In various embodiments, the system 202 is configured to apply the second ML model 204B to generate a set of cache refresh intervals associated with the set of segments that are to be stored at least on one of the second set of electronic devices 208 based on the historical user engagement data. By way of example, and not by limitation, if the system 202 applies the second ML model 204B on the first segment indicating the sky view of the set of segments to generate a cache refresh interval of the set of cache refresh intervals as 1800 seconds (0.5 hour) based on the historical user engagement data associated with the first segment indicating the sky view of the set of segments, then the first segment indicating the sky view of the set of segments is stored at the edge server 208A of the second set of electronic devices 208 for 1800 seconds.

The third ML model 204C may correspond to a Generative Adversarial Network (GAN) architecture, designed for generative tasks such as image synthesis or data augmentation. The model is structured around two primary components: a generator network and a discriminator network. Both networks are typically deep neural networks that interact in an adversarial manner. The GAN framework generates new data samples that resemble existing data without requiring explicit labels which makes GANs versatile tools for tasks like generating realistic images, music, or even text.

The generator network is responsible for creating synthetic data that mimics the characteristics of real data from a given dataset. The generator takes a random noise vector as input and transforms the input into a data sample that ideally should be indistinguishable from real data. The generator's architecture often involves deconvolutional layers to upscale the input noise into a realistic data representation. The process involves complex transformations that capture the underlying patterns and features of the training data, allowing the generator to produce novel samples that are coherent and realistic. The generator's objective is to "fool" the discriminator by generating data that is so realistic that the discriminator cannot distinguish the generated data from real data.

The discriminator network, typically a convolutional neural network, evaluates the generated data and determines whether the generated data is real or fake. The discriminator receives both real data samples from the training dataset and synthetic samples produced by the generator. The discriminator outputs a probability indicating how likely the input data is to be real. The feedback is needed for training the generator to produce more realistic data. The discriminator acts as a critic, providing continuous feedback to the generator, which uses the information to refine its output.

Each node within both the generator and discriminator networks may be associated with weights and biases that are adjusted during training to optimize performance. The learning process involves a minimax game framework where the generator aims to maximize the discriminator's error rate (that is fool the discriminator into thinking generated data is real), while the discriminator seeks to minimize the error by accurately distinguishing real from fake data. The adversarial process is facilitated by a loss function, such as binary cross-entropy, which measures the difference between the discriminator's predictions and the true labels.

During training, the GAN model iteratively updates its parameters using backpropagation. Unlike traditional supervised learning models, GANs typically operate in an unsupervised setting, as the GAN model learns to generate new data without explicit labels. The architecture supports efficient processing on advanced computational resources like graphics processing units (GPU) clusters, enabling the model to handle large datasets effectively.

In various embodiments, the system 202 may be configured to control the second set of electronic devices 208 to apply a third ML model 204C to the first set of segments and the second set of segments to aggregate the first set of segments and the second set of segments to aggregated content 206B. By way of example, and not by limitation, if the first set of segments includes the second segment indicating the audience view and the third segment indicating the field view, and the second set of segments includes the first segment indicating the sky view, then the system may control the second set of electronic devices 208 to apply a third ML model 204C to the first set of segments and the second set of segments to aggregate the first set of segments and the second set of segments and generate the aggregated content 206B. The generator aggregates the first set of segments 308A and the stored second set of segments 510A to generate the aggregated content 206B. The discriminator compares the aggregated content 206B from the generator with the original media content received from the first set of electronic devices 206. Based on the comparison, the system 202 is configured to control the second set of electronic devices 208 to generate the aggregated content 206B.

The fourth ML model 204D may include a Graph Neural Network (GNN) architecture designed for tasks involving graph-structured data. The model is structured in a series of layers, including an input layer, multiple hidden layers (also referred to as message-passing layers), and an output layer. The input layer receives graph data, which is typically represented as a matrix or a list of matrices describing nodes and edges. The hidden layers process the data using message passing, where each node updates its representation by aggregating information from its neighbors. The process is repeated across multiple layers, allowing the model to capture complex relationships within the graph.

Each node within the fourth ML model 204D may be associated with learnable parameters (weights) that are adjusted during training to optimize performance. The learning process involves minimizing a loss function (such as cross-entropy for classification tasks or mean squared error for regression tasks) between predicted outputs and actual labels. The GNN employs backpropagation to update its parameters based on the gradients computed from the loss function.

During training, the GNN may utilize techniques like batch normalization and dropout to improve stability and prevent overfitting. The architecture supports iterative updates through backpropagation, ensuring that the predicted outputs converge toward needed values over time. The model can be implemented using various software frameworks and executed on processing devices like central processing units (CPU) or graphics processing units (GPU) clusters, enabling efficient processing of large graph datasets.

The fourth ML model 204D may also incorporate various electronic data components, including software programs, code libraries, and algorithms designed for execution in distributed computing environments. The integration allows the model to leverage advanced computational resources effectively, facilitating the analysis of complex graph structures in diverse applications such as social networks, molecular structures, and traffic patterns.

In various embodiments, the system 202 may be configured to apply the fourth ML model 204D to device data associated with the first set of electronic devices 206 and the second set of electronic devices 208 to configure a CDN by generating a graph. By way of example, and not by limitation, the system 202 may apply the fourth ML model 204D to device data associated with the first set of electronic devices 206 and the second set of electronic devices 208. The first set of electronic devices 206 and the second set of electronic devices 208 are represented by the nodes, and a connection between each electronic device of the first set of electronic devices 206 and each electronic device of the second set of electronic devices 208 is represented by the edges of the graph. The graph convolution layers the fourth ML model 204D combining features from neighboring nodes to capture dependencies. The graph convolution layers process the graph data to identify connections and paths for content delivery, ensuring efficient use of network resources. The output layer of the GNN model determines node connections and data paths for efficient content delivery. The output layer makes decisions about ways to configure the CDN, considering factors like the network load of the CDN and the user engagement data.

In various embodiments, each device of the first set of electronic devices 206 may correspond to an origin server from which the media content 206A is generated. The media content 206A corresponds to one of a volumetric video, a three-dimensional (3D) video, or a two-dimensional (2D) video. The volumetric video is a video that captures a subject or scene in three dimensions, allowing playback from any angle with six degrees of freedom (6DoF). The 3D video captures two slightly different perspectives to mimic human binocular vision and combines the different perspectives to create a three-dimensional viewing experience. The 2D video two-dimensional visual medium that displays imagery on a flat plane, with only height and width but no depth perception. The first set of electronic devices 206 is configured to store the first set of segments. In various embodiments, each device of the second set of electronic devices 208 may correspond to an edge server 208A or a user device. Each device of the second set of electronic devices 208 is configured to store each segment of the second set of segments for a respective cache refresh interval of the set of cache refresh intervals. Further, each device of the second set of electronic devices 208 is configured to apply the third ML model 204C to the first set of segments and the second set of segments to generate the aggregated content 206B.

The edge server 208A may correspond to a computing resource located at the periphery of a network, designed to process data close to the user device 208B. The edge server 208A is configured to store the second set of segments. In various embodiments, the edge server 208A may be configured to apply the third ML model 204C to the first set of segments and the second set of segments to generate the aggregated content 206B. In various embodiments, the edge server 208A may be configured to store the aggregated content 206B.

The user device 208B may include suitable logic, circuitry, interfaces, and/or code that may be configured to display an interface related to the media content 206A to the first entity 214. In various embodiments, the first entity 214 may correspond to a stand-alone user or an organization. In various embodiments, the user device 208B may be configured to apply the third ML model 204C to the first set of segments and the second set of segments to generate the aggregated media content. In various embodiments, the user device may be configured to render the aggregated content 206B. Examples of the user device 208B may include but are not limited to, a computing device, a mainframe machine, a server, a computer work-station, a smartphone, a cellular phone, a mobile phone, a gaming device, a consumer electronic (CE) device, a head-mounted device, a virtual reality (VR) headset, an augmented reality (AR) Device, a mixed reality (MR) Device, a projection-based system, and/or any device with computer vision display capabilities.

Each data source of the one or more data sources 210 may correspond to an organized collection of data that may be stored and accessed electronically from a computer system (such as the system 202). Each data source of the one or more data sources 210 may be designed to manage, store, retrieve, and update data efficiently. In an exemplary implementation, each data source of the one or more data sources 210 may correspond to a database. In such an implementation, the database corresponding to each data source of the one or more data sources 210 typically stores the historical user engagement data based on which a set of cache intervals for the second set of segments of media content 206A is determined. Details about the historical user engagement data are provided, for example, in the FIG. 4.

The server 212 may include suitable logic, circuitry, interfaces, and/or code that stores one or more data sources 210. The server 212 may be implemented as a cloud server and may execute operations through web applications, cloud applications, hypertext transfer protocol (HTTP) requests, repository operations, file transfer, and the like. Various example implementations of the server 212 may include but are not limited to, a database server, a file server, a web server, a media server, an application server, a mainframe server, or a cloud computing server.

In an embodiment, the server 212 may be further configured to store the generated aggregated content 206B. In an embodiment of the disclosure, the server 212 is implemented as a plurality of cloud-based resources distributed by the use of several technologies that are well known to those ordinarily skilled in the art. A person with ordinary skill in the art will understand that the scope of the disclosure may not be limited to the implementation of the server 212 and the system 202 as two separate entities. In certain embodiments, the functionalities of the server 212 can be incorporated in its entirety or at least partially in the system 202, without a departure from the scope of the disclosure.

In operation, the system 202 is configured to obtain media content 206A from the first set of electronic devices 206 in the first time interval. The media content 206A may correspond to one of a volumetric video, a three-dimensional (3D) video, or a two-dimensional (2D) video. Each electronic device of the first set of electronic devices 206 may correspond to an origin server from which the media content 206A is generated. The media content 206A is stored in at least one of the first set of electronic devices 206. By way of example, and not by limitation, the system 202 obtains the media content 206A as a real-time video streaming of a cricket match.

The system 202 may be configured to extract a set of segments from the media content 206A in the first time interval. Each segment of the set of segments corresponds to a specific portion of the obtained media content 206A. By way of example, and not by limitation, if the media content 206A corresponds to the real-time video streaming of the cricket match, then the set of segments may include three segments such as the first segment including the portion of the real-time video indicating the sky view of the stadium, in which the cricket match is being played, the second segment including the portion of the real-time video indicating the audience view of the stadium, and the third segment including the portion of the real-time video indicating the field view of the stadium.

The system 202 may be further configured to apply the first ML model 204A of the set of ML models 204 on each segment of the set of segments, in the first time interval. The first ML model 204A may include the CNN model and the BiLSTM model. Based on the application of the first ML model 204A the system 202 may be configured to classify each segment of the set of segments into one of a first set of segments or a second set of segments. Each segment of the set of segments is classified segments into one of the first set of segments or the second set of segments based on a rate of temporal changes in the media content 206A of a respective segment of the set of segments. The rate of temporal changes may correspond to the frequency and magnitude of variations in pixel values or motion across consecutive frames of the segment of the set of segments. Each segment of the first set of segments corresponds to a streamable segment and each segment of the second set of segments corresponds to a cacheable segment. In various embodiments, the cacheable segment corresponds to the segment of the set of segments having the rate of temporal changes less than a threshold value. The rate of temporal changes being less than the threshold value is indicative of the slow-changing segment that may be stored in the second set of electronic devices 208. In various embodiments, the streamable segment corresponds to the segment of the set of segments having the rate of temporal changes greater than the threshold value. The rate of temporal changes being greater than the threshold value is indicative of the slow-changing segment that may be streamed from the first set of electronic devices 206. By way of example, and not by limitation, the rate of temporal changes associated with the first segment indicating the sky view is 24 fps (frames per second) and the threshold value is 30 fps, then the first segment indicating the sky view is classified as the cacheable segment.

Further, the system 202 may be configured to apply the second ML model 204B on the second set of segments in the first time interval. Based on the application of the second ML model 204B on the second set of segments, the system 202 may be configured to determine a set of cache refresh intervals associated with the second set of segments, in the first time interval. The second ML model 204B may correspond to the DQN model. The set of cache refresh intervals is determined based on the historical user engagement data. Each cache refresh interval of the set of cache refresh intervals corresponds to a time period after which the corresponding segment of the second set of segments is updated on an electronic device from a second set of electronic devices 208. Each electronic device of the second set of electronic devices 208 may correspond to the edge server 208A or the user device 208B. By way of example, and not by limitation, since only the first segment indicating the sky view is classified as the second set of segments (cacheable segment), the system 202 determines that the cache refresh interval of the first segment indicating the sky view, on the second set of electronic devices 208, is 3600 seconds.

The system 202 may be further configured to store each segment of the second set of segments on the second set of electronic devices 208 based on the determined set of cache refresh intervals, in the first time interval. The system 202 is configured to store the second set of segments for the determined set of cache intervals from the first time interval. By way of example, and not by limitation, since the cache refresh interval of the first segment indicating the sky view, on the second set of electronic devices 208, is 3600 seconds, then the first segment indicating sky view is stored in the second set of electronic devices 208 for 3600 seconds from the first time interval.

The system 202 may be further configured to control the second set of electronic devices 208 to obtain the first set of segments from the first set of electronic devices 206, in the first time interval. By way of example, and not by limitation, since the second segment indicates the audience view and the third segment indicates the field view is classified as the first set of segments, hence the second set of electronic devices 208 may obtain the second segment indicating the audience view and the third segment indicating the field view, directly, from the first set of electronic devices 206.

Further, the system 202 may be configured to control the second set of electronic devices 208 to apply a third ML model 204C of the set of ML models 204 to the obtained first set of segments and the second set of segments, in the second time interval. The third ML model 204C may correspond to the GAN model. Based on the application of the third ML model 204C, the system 202 may be configured to aggregate the obtained first set of segments with the stored second set of segments. By way of example, and not by limitation, the second set of electronic devices 208 aggregate the stored first segment indicating the sky view, the obtained segment indicating the audience view, and the obtained third segment indicating the field view. The system 202 may be further configured to generate the aggregated content 206B based on the aggregation of the obtained first set of segments with the stored second set of segments, in the second time interval. The aggregated content 206B may correspond to the combination of the obtained first set of segments and the stored second set of segments. The system 202 may be further configured to control the second set of electronic devices 208 to output the aggregated content 206B, in the second time interval. In various embodiments, the system 202 may store the aggregated content 206B into the edge server 208A. In an alternate embodiment, the system 202 may render the aggregated content 206B on the user device 208B. By way of example, and not by limitation, the user device 208B of the second set of electronic devices 208 renders the aggregated content 206B as the output.

Figure 3:
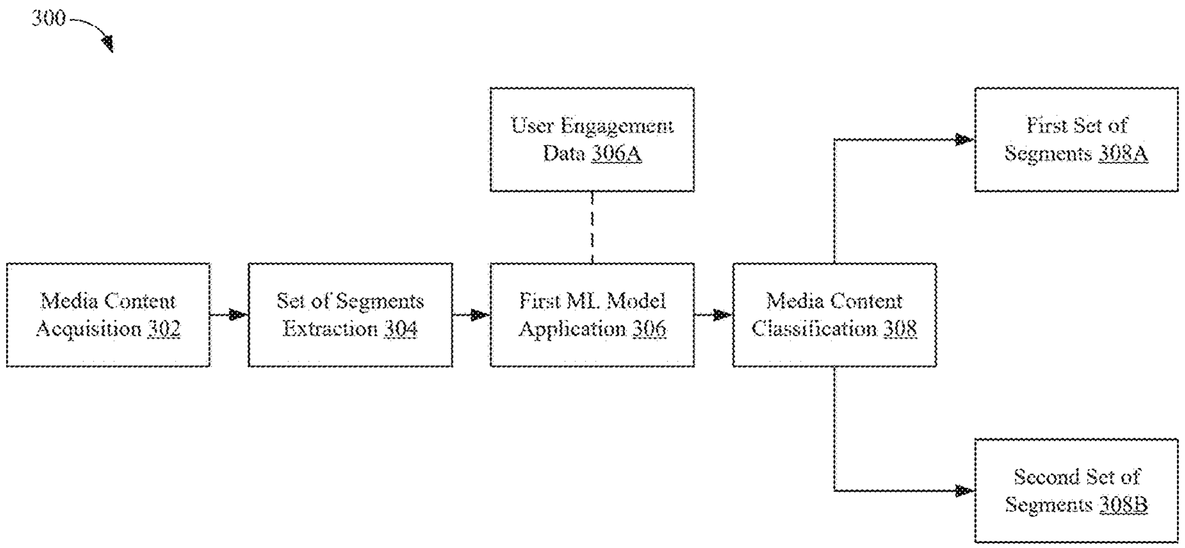
FIG. 3 is a diagram that illustrates exemplary operations for a classification of media content for media content classification and management in a content delivery network, in accordance with an embodiment of the disclosure.

FIG. 3 is a diagram that illustrates exemplary operations for the classification of media content for media content classification and management in a content delivery network, in accordance with various embodiments of the disclosure. FIG. 3 is explained in conjunction with elements from FIG. 1, and FIG. 2. With reference to FIG. 3, there is shown a block diagram 300 that illustrates exemplary operations from 302 to 308, as described herein. The exemplary operations illustrated in the block diagram 300 may start at 302 and may be performed by any computing system, apparatus, or device, such as by the computer 102 of FIG. 1 or system 202 of FIG. 2. Although illustrated with discrete blocks, the exemplary operations associated with one or more blocks of the block diagram 300 may be divided into additional blocks, combined into fewer blocks, or eliminated, depending on the particular implementation.

At 302, a media content acquisition operation is executed. In the media content acquisition operation, the system 202 may be configured to obtain the media content 206A from the first set of electronic devices 206. In various embodiments, the media content 206A may correspond to one of a volumetric video, a three-dimensional (3D) video, or a two-dimensional (2D) video. The volumetric video is a video that captures a subject or scene in three dimensions, allowing playback from any angle with six degrees of freedom (6DoF). The 3D video captures two slightly different perspectives to mimic human binocular vision and combine the different perspectives to create a three-dimensional viewing experience. The 2D video two-dimensional visual medium that displays imagery on a flat plane, with only height and width but no depth perception. Each electronic device of the first set of electronic devices 206 may correspond to an origin server. By way of an example, not by limitation the media content 206A may correspond to the real-time video streaming of the cricket match.

At 304, a set of segments extraction operation may be executed. In a set of segments extraction operation, the system 202 may be configured to extract the set of segments from the media content 206A. The media content 206A corresponds to a form of digitally or physically encoded information, such as text, audio, video, images, graphics, or interactive elements, that is created, stored, transmitted, or consumed through various communication channels and technologies. By way of example, and not by limitation, if the media content 206A corresponds to the real-time video streaming of the cricket match, then the set of segments may include three segments such as the first segment including the portion of the real-time video indicating the sky view of the stadium, in which the cricket match is being played, the second segment including the portion of the real-time video indicating the audience view of the stadium, and the third segment including the portion of the real-time video indicating the field view of the stadium.

At 306, executing a first ML model application operation. In the first ML model application operation, the system 202 may be configured to apply the first ML model 204A on the extracted set of segments based on user engagement data 306A. In various embodiments, the user engagement data 306A may include a set of actions performed by a user (the first entity 214) on at least one segment of the set of segments. The set of actions performed by the user may include, such as, a specific user engages with, clicks, or zooms in over at least one segment of the set of segments. By way of example, and not by limitation, if the media content 206A corresponds to real-time video streaming of the cricket match, and the user is zooming in on the third segment indicating the field view segment of the set of segments, then the action of the user of "zooming in to the field view segment" is the user engagement data 306A of the user.

In various embodiments, the system may be configured to apply the first ML model 204A to each segment of the set of segments. The first ML model 204A may include the CNN model and a BiLSTM model. The CNN model includes layers, convolutional, activation functions, and pooling layers, which process the raw volumetric data to identify key features, such as the structure of objects, the textures of the objects, and spatial relationships within each segment of the set of segments. The convolution layer filters each segment of the set of segments to extract local features like edges, textures, and shapes. The activation function introduces non-linearity to enhance feature extraction. One of the examples of the activation function is a rectified linear unit (ReLU). The pooling layers down sample the feature maps from the convolutional layer to retain information while reducing dimensions. The process transforms the media content 206A (such as volumetric content) into a format that retains visual information. The embedding layer of the CNN model converts extracted features into dense vectors forming sequences. The embedding layer transforms the feature data into sequential data (also referred to as lower-dimensional vectors), capturing the essence of the features while maintaining the contextual relationships of the objects in the sequence, making processing and detection of patterns easier for the BILSTM over time. By way of example, and not by limitation, the sequential data corresponding to each segment of the set of segments may be represented by the following expression:

First segment indicates the sky view: [0.1, 0.2, 0.1, 0.2]

Second segment indicates the audience view: [0.4, 0.5, 0.4, 0.5]

Third segment indicates the field view: [0.7, 0.8, 0.7, 0.8]

Where each value in sequential data is associated with at least a key feature of a respective segment.

In various embodiments, the BiLSTM process analyzes sequential data received from the output layer (also referred to as a fully connected layer) of the CNN model. The BiLSTM model processes the data in two different passes, a forward pass and a backward pass. The forward pass processes the sequences in the received sequential data from start to end, capturing forward dependencies. The forward pass determines the forward dependencies from the beginning of the sequence data to the end of the sequence data, understanding how earlier parts of the content influence later parts. The backward pass processes sequences, in the sequence data, from end to start, capturing backward dependencies. The backward pass determines the backward dependencies from the end of the sequence data to the beginning of the sequence data, understanding how later parts of the content influence earlier parts. The output from both forward LSTM and backward LSTM is combined for a comprehensive understanding of a rate of temporal change associated with each segment of the set of segments. The dense layer of the CNN model learns complex relationships between features. The layer processes the concatenated outputs to learn patterns and relationships that are critical for the classification to be accurate. The output layer uses the softmax activation function to classify content portions as the first set of segments 308A or the second set of segments 308B. The softmax activation function outputs probabilities for each of the first set of segments 308A or the second set of segments 308B, enabling the system to make informed decisions based on the user engagement data 306A and the rate of temporal changes associated with each segment of the set of segments.

At 308, executing a media content classification operation. In the media content classification operation, the system 202 may be configured to classify each segment of the set of segments into at least one of the first set of segments 308A or the second set of segments 308B based on the application of the first ML model 204A. In various embodiments, the first set of segments corresponds to a streamable segment and each segment of the second set of segments 308B corresponds to a cacheable segment. In various embodiments, each segment of the set of segments is classified based on the rate of temporal changes associated with each segment of the set of segments. In various embodiments, the rate of temporal changes may correspond to a frequency and magnitude of variations in pixel values or motion across consecutive frames of the segment of the set of segments. By way of example, and not by limitation the segment of the set of segments may be determined as a static segment, a slow-changing segment, a moderate-changing segment, and a fast-changing segment based on the rate of temporal changes.

By way of example, and not by limitation, if the media content 206A corresponds to the real-time video streaming of the cricket match and the first segment indicating the sky view of the set of segments has the slow-changing rate, then the first segment indicating the sky view is classified as the cacheable content. The system 202 may be configured to store the sky view as the second set of segments 308B. Similarly, the second segment indicating the field view of the set of segments has a fast-changing rate, and then the first segment indicating the sky view is classified as the streamable content. The system 202 may be configured to store the second segment indicating the field view as the first set of segments 308A.

Figure 4:
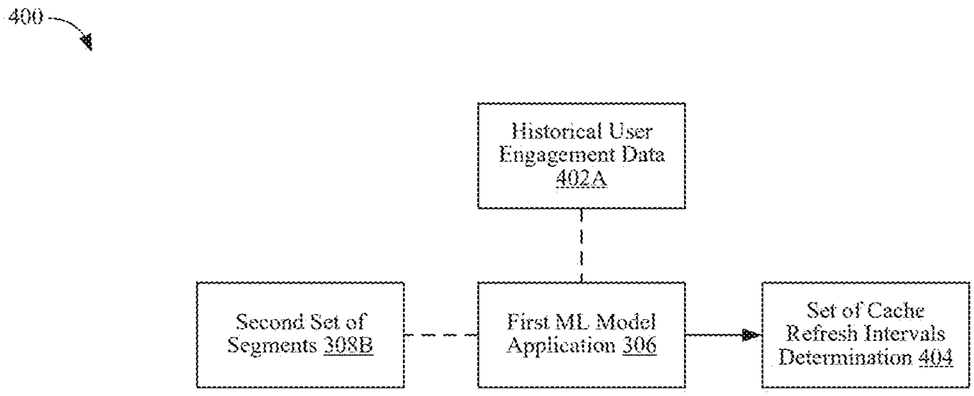
FIG. 4 is a diagram that illustrates exemplary operations for a determination of a set of cache refresh intervals for media content classification and management in a content delivery network, in accordance with an embodiment of the disclosure.

FIG. 4 is a diagram that illustrates exemplary operations for the determination of a set of cache refresh intervals for media content classification and management in a content delivery network, in accordance with various embodiments of the disclosure. FIG. 4 is explained in conjunction with elements from FIG. 1, FIG. 2, and FIG. 3. With reference to FIG. 4, there is shown a block diagram 400 that illustrates exemplary operations from 402 to 404, as described herein. The exemplary operations illustrated in the block diagram 400 may start at 402 and may be performed by any computing system, apparatus, or device, such as by the computer 102 of FIG. 1 or the system 202 of FIG. 2. Although illustrated with discrete blocks, the exemplary operations associated with one or more blocks of the block diagram 400 may be divided into additional blocks, combined into fewer blocks, or eliminated, depending on the particular implementation.

At 402, executing a second ML model application. In a second ML model application operation, the system 202 may be configured to apply a second ML model 204B on the second set of segments 308B. The system 202 may be configured to apply a second ML model 204B on the second set of segments 308B based on the historical user engagement data 402A.

In various embodiments, the second ML model 204B may correspond to a DQN model. The DQN model takes input as a multi-dimensional vector for a state representation of the edge server 208A associated with at least a segment of the set of segments. The vector includes information on the current state of the cache in the edge server 208A, network conditions, and predicted user engagement based on the historical user engagement data 402A, which allows the DQN to understand the environment and make informed decisions. The DQN model includes convolutional layers that extract spatial features from the state representations. The convolutional layers process the state representation to identify patterns and dependencies that are needed for decision-making. The DON includes the dense layers that learn Q-values representing expected future rewards of actions associated with each segment of the set of segments. The dense layers use the extracted features to approximate the Q-value function, which predicts the future rewards of different cache management actions associated with each segment of the set of segments. The system 202 evaluates Q-values for actions (actions may correspond to cache refresh, direct streaming, and CDN configuration) and selects one. The DQN uses the Q-values to determine the needed action to take at each process, aiming to maximize long-term rewards. The DON uses a reward-based mechanism to adapt decision-making over time, improving cache management efficiency.

At 404, executing a set of cache refresh intervals determination operation. In the set of cache refresh intervals determination operation, the system 202 may be configured to determine the set of cache refresh intervals based on the application of the second ML model 204B on the second set of segments 308B. In various embodiments, each cache refresh interval of the set of cache refresh intervals corresponds to the time period after which the corresponding segment of the second set of segments 308B is updated on an electronic device from the second set of electronic devices 208.

The system 202 may be configured to store each segment of the second set of segments 308B the on the edge server 208A of the second set of electronic devices 208 for a cache refresh interval of the set of cache refresh intervals based on the application of the second ML model 204B. In various embodiments, the system 202 is configured to generate the set of cache refresh intervals associated with the set of segments that are to be stored at least on one of the second set of electronic devices 208. By way of example, and not by limitation, if the system 202 determines the cache refresh interval of the set of cache refresh intervals for the first segment indicating the sky view of the second set of segments 308B associated with the edge server 208A of the second set of electronic devices 208 as 1800 seconds (0.5 hour) based on the application of the second ML model 204B, then the segment of the set of segments is stored at the edge server 208A of second set of electronic devices 208 for 1800 seconds.

Figure 5:
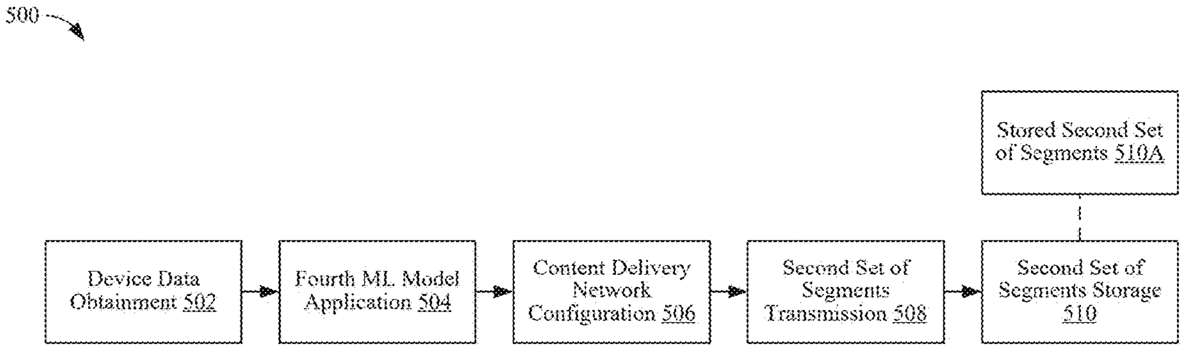
FIG. 5 is a diagram that illustrates exemplary operations for a configuration of a content delivery network for media content classification and management in a content delivery network, in accordance with an embodiment of the disclosure.

FIG. 5 is a diagram that illustrates exemplary operations for configuration of a content delivery network for media content classification and management in a content delivery network, in accordance with various embodiments of the disclosure. FIG. 5 is explained in conjunction with elements from FIG. 1, FIG. 2, FIG. 3, and FIG. 4. With reference to FIG. 5, there is shown a block diagram 500 that illustrates exemplary operations from 502 to 510, as described herein. The exemplary operations illustrated in the block diagram 500 may start at 502 and may be performed by any computing system, apparatus, or device, such as by the computer 102 of FIG. 1 or the system 202 of FIG. 2. Although illustrated with discrete blocks, the exemplary operations associated with one or more blocks of the block diagram 500 may be divided into additional blocks, combined into fewer blocks, or eliminated, depending on the particular implementation.

At 502, executing a device data obtainment operation. In the device data obtainment operation, the system 202 may obtain device data associated with each electronic device of the first set of electronic devices 206 and the second set of electronic devices 208. In various embodiments, the device data associated with each electronic device of the first set of electronic devices 206 and each electronic device of the second set of electronic devices 208 may include specific attributes, which are used to identify the respective electronic device in a network (also referred to as WAN 104 in FIG. 2). In various embodiments, the specific attributes may include an internet protocol (IP) address of each electronic device of the first set of electronic devices 206 and each electronic device of the second set of electronic devices 208, a media access control (MAC) address of each electronic device of the first set of electronic devices 206 and each electronic device of the second set of electronic devices 208, a type of each electronic device of the first set of electronic devices 206 and each electronic device of the second set of electronic devices 208, a host name associated with each electronic device of the first set of electronic devices 206 and each electronic device of the second set of electronic devices 208, the operating system (OS) of each electronic device of the first set of electronic devices 206 and each electronic device of the second set of electronic devices 208, central processing unit (CPU) storage associated with each electronic device of the first set of electronic devices 206 and each electronic device of the second set of electronic devices 208, or the like.

At 504, executing a fourth ML model application operation. In the fourth ML model application operation, the system 202 may apply the fourth ML model 204D on the device data. In various embodiments, the fourth ML model 204D may correspond to the GNN model. The GNN model is structured in a series of layers, including an input layer, multiple hidden layers (also referred to as message-passing layers), and an output layer. The input layer constructs a graph based on the device data, which typically represents the list of matrices describing nodes and edges. The first set of electronic devices 206 and the second set of electronic devices 208 are represented by the nodes, and a connection between each electronic device of the first set of electronic devices 206 and each electronic device of the second set of electronic devices 208 is represented by the edges of the graph. The graph convolution layers (also referred to as hidden layers of GNN) of the GNN model combine features from neighboring nodes to capture dependencies and perform the CDN configuration. The graph convolution layers process the graph data to identify connections and paths for content delivery, ensuring efficient use of network resources. The output layer of the GNN model determines node connections and data paths for efficient content delivery. The output layer makes decisions about ways to configure the CDN, considering factors like the network load of the CDN and the user engagement data.

At 506, executing a content delivery network configuration. In the content delivery network configuration operation, the system 202 may configure the CDN. The system 202 may be configured to configure a CDN based on the application of the fourth ML model 204D on the device data. In various embodiments, the CDN may include the first set of electronic devices 206 and the second set of electronic devices 208.

In various embodiments, the CDN is a distributed architecture including a network of interconnected devices strategically located across different geographical regions. The core components of a CDN include the first set of electronic devices 206, which host the original content, a set of edge servers of the second set of electronic devices 208 (also known as delivery nodes), which cache and deliver content to users based on proximity, and domain name system DNS servers, which direct user requests to the nearest edge server of the second set of electronic devices 208. The architecture also involves a set of control nodes for management and routing, and storage nodes for tiered caching. CDN operates by caching the second set of segments 308B at each edge server of the second set of electronic devices 208. In various embodiments, the system 202 may be configured to manage the CDN.

At 508, executing a second set of segments transmission operation. In the second set of segments transmission operation, the system 202 may transmit the second set of segments 308B to the second set of electronic devices 208 based on the configured CDN In various embodiments, the system 202 may be configured to transmit the second set of segments 308B to the edge server 208A of the second set of electronic devices 208. By way of example, and not by limitation, if the media content 206A corresponds to the real-time video streaming of the cricket match, then the second set of segments may correspond to the first segment indicating the sky view of real-time video streaming of the cricket match. The system 202 may transmit the first segment indicating the sky view to the edge server of the second set of electronic devices 208 via the configured CDN.

In various embodiments, the system 202 may be configured to transmit the second set of segments to the user device 208B of the second set of electronic devices 208. By way of example, and not by limitation, if media content 206A corresponds to the real-time video streaming of the cricket match, then the second set of segments 308B may correspond to the first segment indicating the sky view. The system 202 may transmit the first segment indicating the sky view to the end-user device of the second set of electronic devices 208 in the CDN.

At 510, a second set of segments storage operations is executed. In the second set of segments storage operation, the system 202 may control the second set of electronic devices 208 to store each segment of the transmitted second set of segments 308B. In various embodiments, the system 202 may be configured to control the edge server 208A of the second set of electronic devices 208 to store the second set of segments 308B. In various embodiments, the edge server 208A may contain the stored second set of segments 510A for the respective cache refresh interval of the set of cache refresh intervals.

Figure 6:
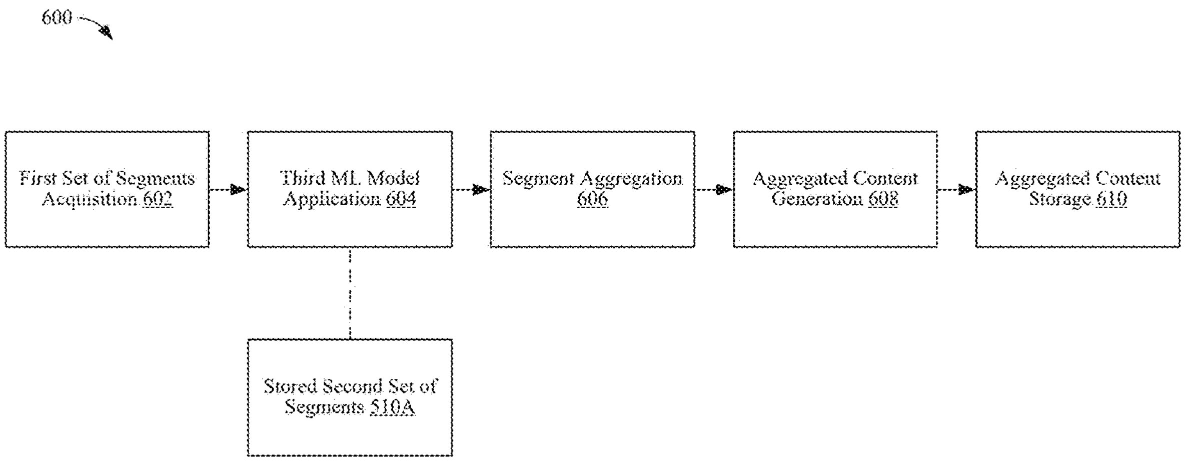
FIG. 6 is a diagram that illustrates first exemplary operations for a generation of aggregated content by the second set of electronic devices for media content classification and management in a content delivery network, in accordance with an embodiment of the disclosure.

FIG. 6 is a diagram that illustrates first exemplary operations for the generation of aggregated content by the second set of electronic devices for media content classification and management in a content delivery network, in accordance with various embodiments of the disclosure. FIG. 6 is explained in conjunction with elements from FIG. 1, FIG. 2, FIG. 3, FIG. 4, and FIG. 5. With reference to FIG. 6, there is shown a block diagram 600 that illustrates exemplary operations from 602 to 610, as described herein. The exemplary operations illustrated in the block diagram 600 may start at 602 and may be performed by any computing system, apparatus, or device, such as by the computer 102 of FIG. 1 or the system 202 of FIG. 2. Although illustrated with discrete blocks, the exemplary operations associated with one or more blocks of the block diagram 600 may be divided into additional blocks, combined into fewer blocks, or eliminated, depending on the particular implementation.

At 602, executing a first set of segments acquisition operation. In the first set of segments acquisition operation, the system 202 may control the edge server 208A of the second set of electronic devices 208 to obtain the first set of segments 308A from the first set of electronic devices 206. The first set of segments 308A corresponds to the streamable segment of the media content 206A. The first set of electronic devices 206 stores the first set of segments 308A for the direct streaming. The second set of electronic devices 208 obtains the first set of segments 308A from the first set of electronic devices 206. By way of example, and not by limitation, if the media content 206A corresponds to the real-time video streaming of the cricket match, then the segment of the first set of segments 308A may correspond to the third segment indicating the field view of the real-time video streaming of the cricket match. The system 202 may control the edge server 208A to obtain the third segment indicating the field view from the first set of electronic devices 206.

At 604, executing a third ML model application operation. In the third ML model application operation, the system 202 may control the second set of electronic devices 208 to apply the third ML model 204C on the obtained first set of segments 308A and the stored second set of segments 510A. In various embodiments, the system 202 may be configured to control the second set of electronic devices 208 to apply the third ML model 204C to aggregate the obtained first set of segments 308A and the stored second set of segments 510A.

In various embodiments, the third ML model 204C may correspond to the GAN model. The GAN model is structured around two primary components: a generator network and a discriminator network. The generator network combines the obtained first set of segments 308A and the stored second set of segments 510A to generate high-fidelity aggregated content 206B. The generator uses dense and convolutional layers to produce a seamless final output. The dense layers help in processing complex patterns and features, while the convolutional layers are adept at handling spatial hierarchies in the obtained first set of segments 308A and the stored second set of segments 510A. The discriminator network distinguishes between the media content 206A and the aggregated content 206B using convolutional and dense layers. The discriminator evaluates the quality of the aggregated media content, ensuring the generated content matches the realism and fidelity of the media content 206A.

At 606, executing a segment aggregation operation. In the segment aggregation operation, the system 202 may control the second set of electronic devices 208 to aggregate the obtained first set of segments 308A and the stored second set of segments 510A. In various embodiments, the system 202 may be configured to control the second set of electronic devices 208 to aggregate the obtained first set of segments 308A and the stored second set of segments 510A based on the application of the third ML model 204C. By way of example, and not by limitation, if the media content 206A corresponds to the real-time video streaming of the cricket match, then the segment of the first set of segments 308A may correspond to the third segment indicating the field view and the second set of segments 308B (or the stored second set of segments 510A) may correspond to the first segment indicating the sky view and the second segment indicating the audience view. The system 202 may be configured to control the second set of electronic devices 208 to aggregate the first segment indicating the sky view, the third segment indicating the field view, and the second segment indicating the audience view.

At 608, executing an aggregated content generation operation. In the aggregated content generation operation, the system 202 may generate the aggregated content 206B based on the aggregation of the obtained first set of segments 308A and the stored second set of segments 510A. In various embodiments, the aggregated content 206B may include the obtained first set of segments 308A and the stored second set of segments 510A. By way of example, and not by limitation, if the media content 206A corresponds to the real-time video streaming of the cricket match, then the segment of the first set of segments 308A may correspond to the third segment indicating the field view and the second set of segments 308B may correspond to the first segment indicating the sky view and the second segment indicating the audience view. The system 202 may generate the aggregated content 206B based on the aggregation of the first segment indicating the sky view, the third segment indicating the field view, and the second segment indicating the audience view.

At 610, executing an aggregated content storage operation. In the aggregated content storage operation, the system 202 may control the second set of electronic devices 208 to store the aggregated content 206B. In various embodiments, the system 202 may control the edge server 208A to store the aggregated content 206B. By way of example, and not by limitation, if the media content 206A corresponds to the real-time video streaming of the cricket match, then the segment of the first set of segments 308A may correspond to the third segment indicating the field view and the second set of segments 308B may correspond to the first segment indicating the sky view and the second segment indicating the audience view. The system 202 may control the second set of electronic devices 208 to store the aggregated content 206B, which includes the first segment indicating the sky view, the third segment indicating the field view, and the second segment indicating the audience view.

Figure 7:
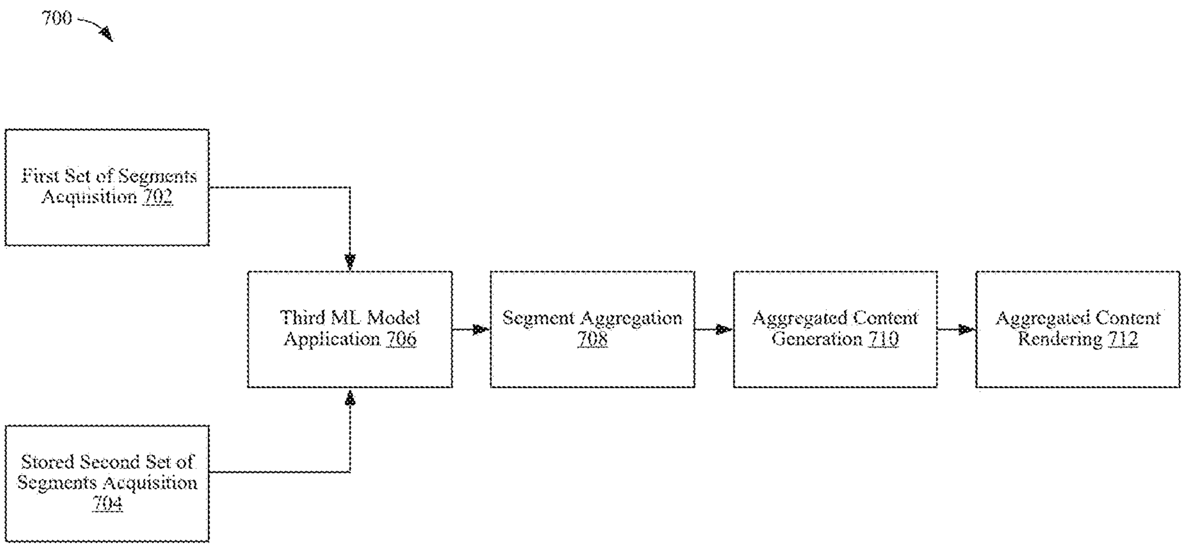
FIG. 7 is a diagram that illustrates second exemplary operations for a generation of aggregated content by the second set of electronic devices for media content classification and management in a content delivery network, in accordance with an embodiment of the disclosure.

FIG. 7 is a diagram that illustrates second exemplary operations for the generation of aggregated content by the second set of electronic devices for media content classification and management in a content delivery network, in accordance with various embodiments of the disclosure. FIG. 7 is explained in conjunction with elements from FIG. 1, FIG. 2, FIG. 3, FIG. 4, FIG. 5, and FIG. 6. With reference to FIG. 7, there is shown a block diagram 700 that illustrates exemplary operations from 702 to 712, as described herein. The exemplary operations illustrated in the block diagram 700 may start at 702 and may be performed by any computing system, apparatus, or device, such as by the computer 102 of FIG. 1 or the system 202 of FIG. 2. Although illustrated with discrete blocks, the exemplary operations associated with one or more blocks of the block diagram 700 may be divided into additional blocks, combined into fewer blocks, or eliminated, depending on the particular implementation.

At 702, executing a first set of segments acquisition operations. In the first set of segments acquisition operation, the system 202 may control the user device 208B of the second set of electronic devices 208 to obtain the first set of segments 308A from the first set of electronic devices 206. By way of example, and not by limitation, if the media content 206A corresponds to the real-time video streaming of the cricket match, and the rate of temporal changes of the second segment indicating the field view is greater than the threshold value, then the segment of the first set of segments 308A may correspond to the second segment indicating the field view of the media content 206A. The system 202 may control the end-user device to obtain the second segment indicating the field view from the first set of electronic devices 206.

At 704, executing a second set of segments acquisition operation. In the second set of segments acquisition operation, the system 202 may control the user device 208B of the second set of electronic devices 208 to obtain the stored second set of segments 308B from the second set of electronic devices 208. By way of example, and not by limitation, if the media content 206A corresponds to the real-time video streaming of the cricket match, then the segment of the second set of segments 308B may correspond to the first segment indicating the sky view of the media content 206A. The system 202 may control the end-user device to obtain the first segment indicating the sky view from the second set of electronic devices 208.

At 706, executing a third ML model application operation. In the third ML model application operation, the system 202 may control the second set of electronic devices 208 to apply the third ML model 204C on the obtained first set of segments 308A and the stored second set of segments 510A. In various embodiments, the system 202 may be configured to control the second set of electronic devices 208 to apply the third ML model 204C to aggregate the obtained first set of segments 308A and the stored second set of segments 510A.

At 708, executing a segment aggregation operation. In the segment aggregation operation, the system 202 may control the second set of electronic devices 208 to aggregate the obtained first set of segments 308A and the stored second set of segments 510A. In various embodiments, the system 202 may be configured to control the second set of electronic devices 208 to aggregate the obtained first set of segments 308A and the stored second set of segments 510A based on the application of the third ML model 204C. By way of example, and not by limitation, if the media content 206A corresponds to the real-time video streaming of the cricket match, then the segment of the first set of segments 308A may correspond to the third segment indicating the field view and the second set of segments 308B may correspond to the first segment indicating the sky view and the third segment indicating the audience view. The system 202 may be configured to control the second set of electronic devices 208 to aggregate the first segment indicating the sky view, the third segment indicating the field view, and the second segment indicating the audience view.

At 710, executing an aggregated content generation operation. In the aggregated content generation operation, the system 202 may generate the aggregated content 206B based on the aggregation of the obtained first set of segments 308A and the stored second set of segments 510A. In various embodiments, the aggregated content 206B may include the obtained first set of segments 308A and the stored second set of segments 510A. By way of example, and not by limitation, if the media content 206A corresponds to the real-time video streaming of the cricket match, then the segment of the first set of segments 308A may correspond to the third segment indicating the field view and the second set of segments 308B may correspond to the first segment indicating the sky view and the third segment indicating the audience view. The system 202 may generate the aggregated content 206B based on the aggregation of the first segment indicating the sky view, the third segment indicating the field view, and the second segment indicating the audience view.

At 712, executing an aggregated content rendering operation. In the aggregated content rendering operation, the system 202 may control the second set of electronic devices 208 to render the aggregated content 206B. In various embodiments, the system 202 may control the user device 208B of the second set of electronic devices 208 to render the aggregated content 206B. By way of example, not by limitation, if the media content 206A corresponds to the real-time video streaming of the cricket match, then the segment of the first set of segments 308A may correspond to the third segment indicating the field view and the second set of segments 308B may correspond to the first segment indicating the sky view and the second segment indicating the audience view. The system 202 may control the second set of electronic devices 208 to render the aggregated content 206B, which includes the first segment indicating the sky view, the third segment indicating the field view, and the second segment indicating the audience view.

Figure 8A:
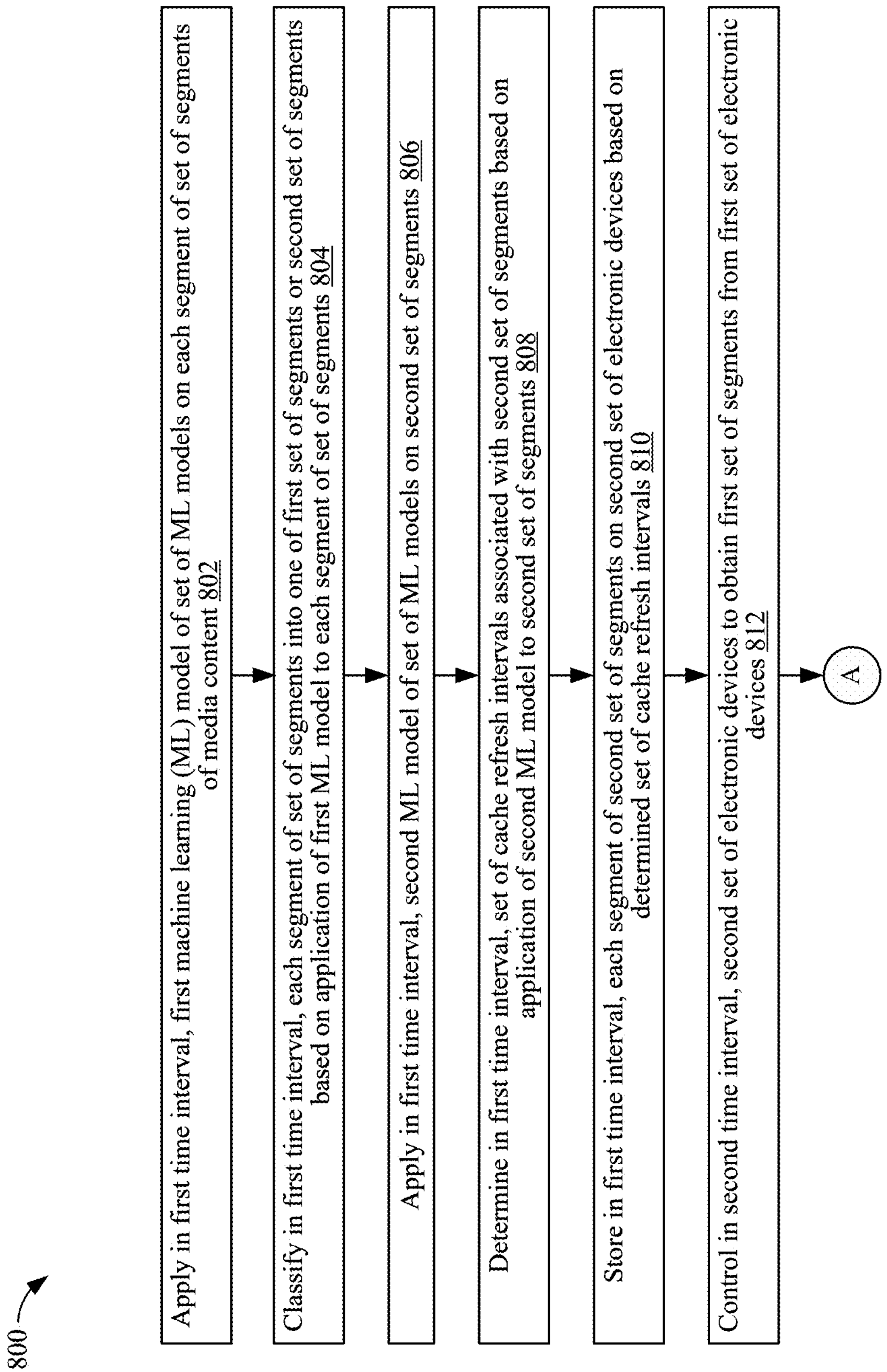
FIG. 8A and FIG. 8B, collectively illustrate a flowchart of a first exemplary method for media content classification and management in a content delivery network, in accordance with an embodiment of the disclosure.
Figure 8B:
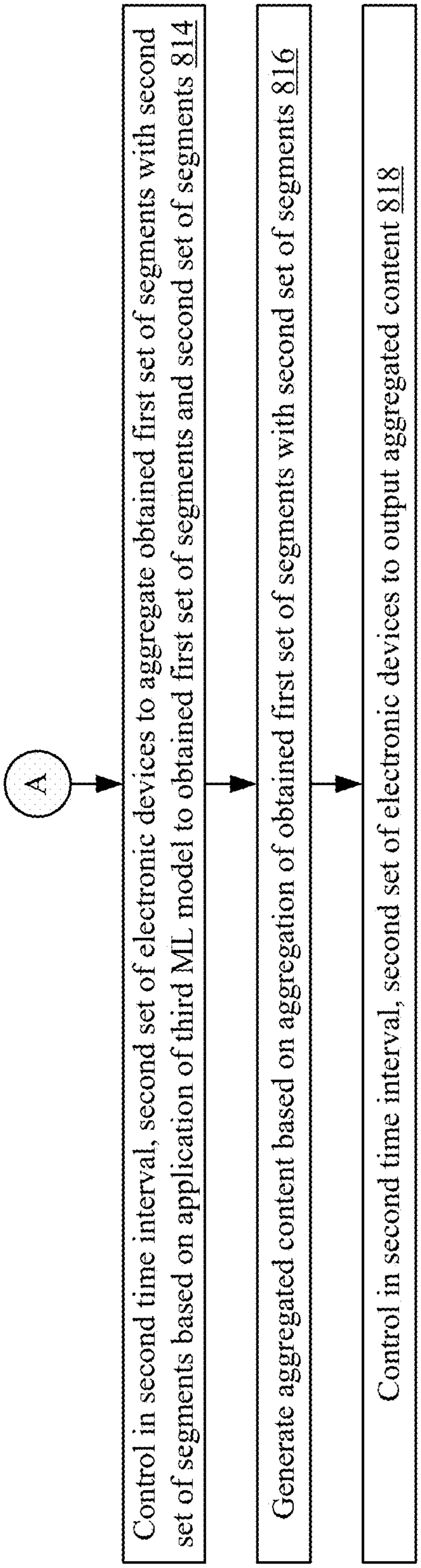

FIG. 8A and FIG. 8B, collectively illustrate a flowchart of a first exemplary method for media content classification and management in a content delivery network, in accordance with various embodiments of the disclosure. FIG. 8A and FIG. 8B are explained in conjunction with elements from FIG. 1, FIG. 2, FIG. 3, FIG. 4, FIG. 5, FIG. 6, and FIG. 7. With reference to FIG. 8A and FIG. 8B, there is shown a flowchart 800. The operations of the exemplary method may be executed by any computing system, for example, by the computer 102 of FIG. 1 or the system 202 of FIG. 2. The operations of the flowchart 800 may start at 802.

At 802 of FIG. 8A, in the first time interval, the first ML model 204A of the set of ML models 204 on each segment of the set of segments is applied. In various embodiments, the system 202 is configured to apply in the first time interval, the first ML model 204A of the set of ML models 204 on each segment of the set of segments. Details about the application of the first ML model 204A operation are provided, for example, in FIG. 3.

At 804 of FIG. 8A, classifying, in the first time interval, each segment of the set of segments. In various embodiments, the system 202 is configured to classify each segment of the set of segments into one of the first set of segments 308A or the second set of segments 308B based on the application of the first ML model 204A to each segment of the set of segments. Each segment of the first set of segments 308A corresponds to the streamable segment and each segment of the second set of segments 308B corresponds to the cacheable segment. Details about the classification of the set of segments operations are provided, for example, in FIG. 3.

At 806 of FIG. 8A, applying, in the first time interval, the second ML model 204B. In various embodiments, the system 202 is configured to apply in the first time interval, the second ML model 204B of the set of ML models 204 on the second set of segments 308B. Details about the application of the second ML model operation are provided, for example, in FIG. 4.

At 808 of FIG. 8A, determining, in the first time interval, the set of cache refresh intervals. In various embodiments, the system 202 is configured to determine in the first time interval, a set of cache refresh intervals associated with the second set of segments 308B based on the application of the second ML model 204B to the second set of segments 308B. Details about the determination of cache refresh intervals operation are provided, for example, in FIG. 4.

At 810 of FIG. 8A, storing, in the first time interval, each segment of the second set of segments 308B. In various embodiments, the system 202 is configured to store each segment of the second set of segments 308B on the second set of electronic devices 208 based on the determined set of cache refresh intervals. The second set of electronic devices 208 is different from the first set of electronic devices 206. Details about the storage of the second set of segments operation are provided, for example, in FIG. 4.

At 812 of FIG. 8A, controlling, in the second time interval, the obtainment of the first set of segments 308A by the second set of electronic devices 208. In various embodiments, the system 202 is configured to control the second set of electronic devices 208 to obtain the first set of segments 308A from the first set of electronic devices 206. The second time interval is subsequent to the first time interval. Details about the controlling of the second set of electronic devices 208 to obtain the first set of segments operation are provided, for example, in FIG. 6 and FIG. 7.

At 814 of FIG. 8B, controlling in the second time interval, the aggregation of the obtained first set of segments 308A with the second set of segments 308B by the second set of electronic devices 208. In various embodiments, the system 202 is configured to control in the first time interval, the second set of electronic devices 208 to aggregate the obtained first set of segments 308A with the second set of segments 308B based on the application of the third ML model 204C to the obtained first set of segments 308A and the second set of segments 308B. The second time interval is subsequent to the first time interval. Details about the controlling of the second set of electronic devices 208 to aggregate the obtained first set of segments 308A with the second set of segments operation are provided, for example, in FIG. 6 and FIG. 7.

At 816 of FIG. 8B, generating in the second time interval, the aggregated content 206B. In various embodiments, the system 202 is configured to generate in the second time interval, the aggregated content 206B based on the aggregation of the obtained first set of segments 308A with the second set of segments 308B. Details about the generation of the aggregated content operation are provided, for example, in FIG. 6 and FIG. 7.

At 818 of FIG. 8B, controlling in the second time interval, the outputting of the aggregated content 206B by the second set of electronic devices 208. In various embodiments, the system 202 is configured to control in the second time interval, the second set of electronic devices 208 to output the aggregated content 206B. The second time interval is subsequent to the first time interval. Details about the controlling of the second set of electronic devices 208 to obtain the first set of segments operation are provided, for example, in FIG. 6 and FIG. 7.

While the above steps shown in FIG. 8A and FIG. 8B are described in a particular sequence, the steps may occur in variations to the sequence in accordance with various embodiments of the present disclosure. Further, details related to various steps of FIG. 8A and FIG. 8B, which are already covered in the description related to FIG. 1, FIG. 2, FIG. 3, FIG. 4, FIG. 5, FIG. 6, and FIG. 7, are not discussed again in detail here for the sake of brevity.

Figure 9A:
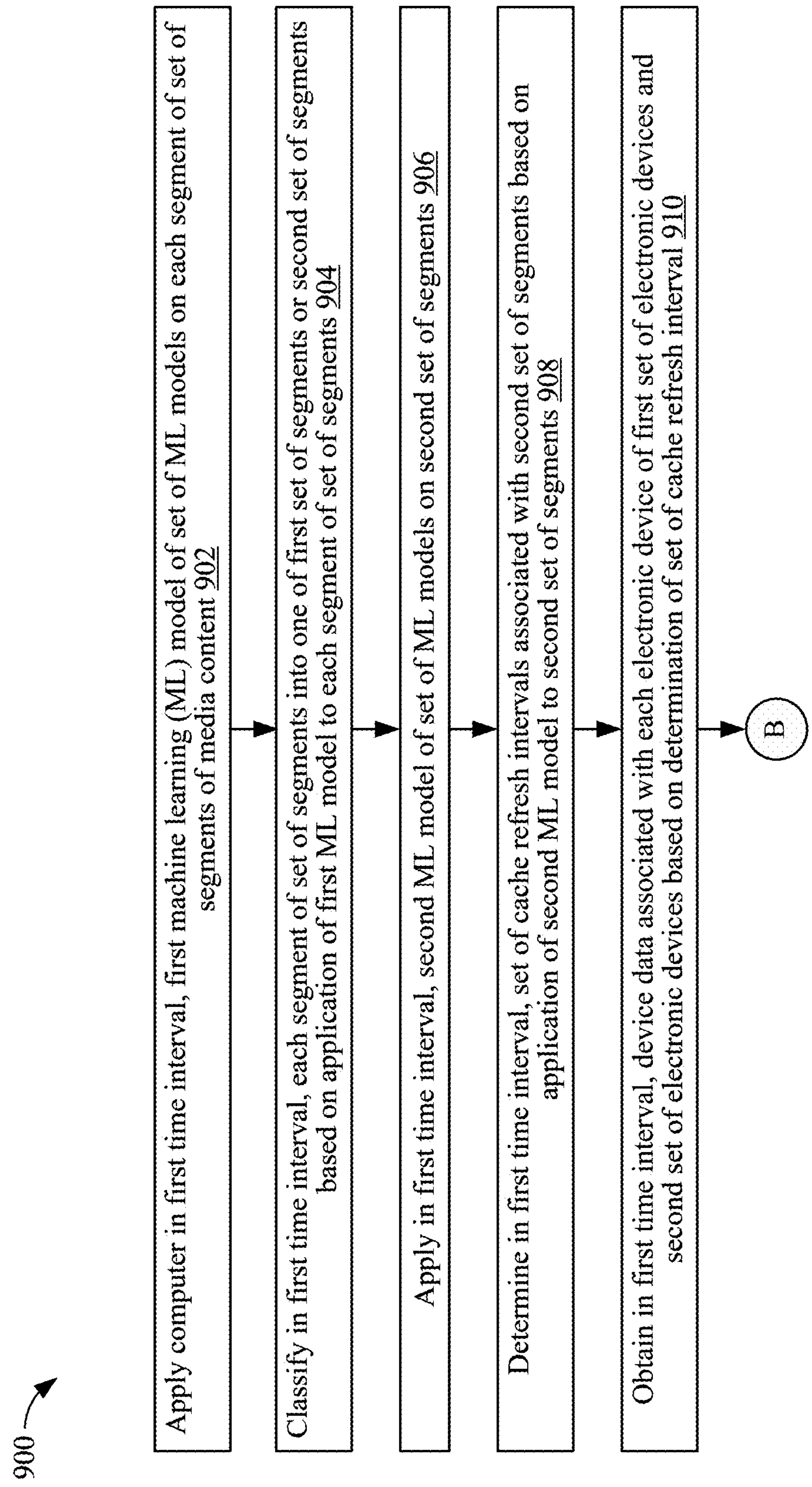
FIG. 9A and FIG. 9B, collectively illustrate a flowchart of a second exemplary method for media content classification and management in a content delivery network, in accordance with an embodiment of the disclosure.
Figure 9B:
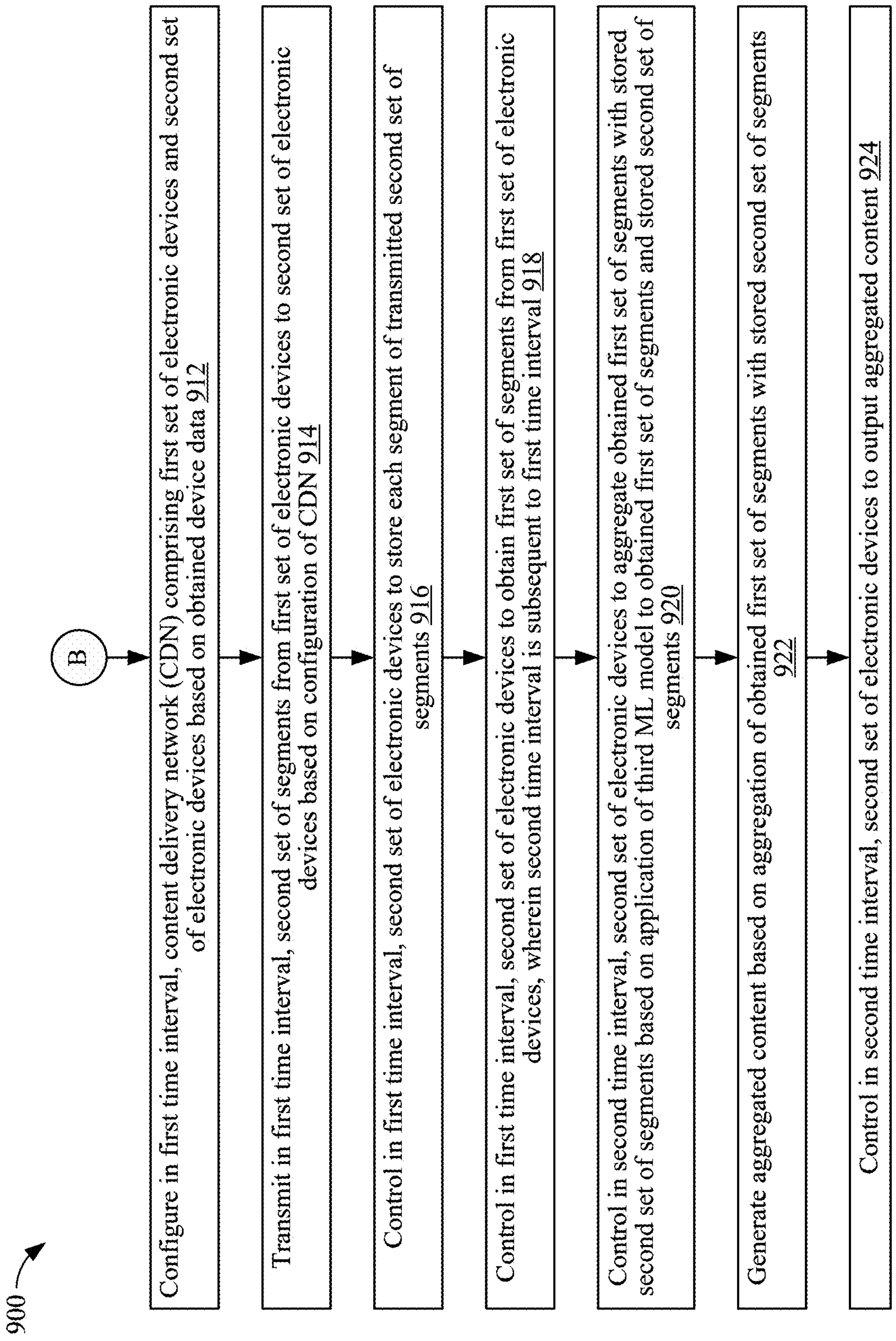

FIG. 9A and FIG. 9B, collectively illustrate a complete flowchart of a first exemplary method for media content classification and management in a content delivery network, in accordance with various embodiments of the disclosure. FIG. 9A and FIG. 9B are explained in conjunction with elements from FIG. 1, FIG. 2, FIG. 3, FIG. 4, FIG. 5, FIG. 6, FIG. 7, FIG. 8A, and FIG. 8B. With reference to FIG. 9A and FIG. 9B, there is shown a flowchart 900. The operations of the exemplary method may be executed by any computing system, for example, by the computer 102 of FIG. 1 or the system 202 of FIG. 2. The operations of the flowchart 900 may start at 902.

At 902 of FIG. 9A, applying, in the first time interval, the first ML model 204A of the set of ML models 204 on each segment of the set of segments. In various embodiments, the system 202 is configured to apply in the first time interval, the first ML model 204A of the set of ML models 204 on each segment of the set of segments. Details about the application of the first ML model 204A operation are provided, for example, in FIG. 3.

At 904 of FIG. 9A, classifying, in the first time interval, each segment of the set of segments. In various embodiments, the system 202 is configured to classify each segment of the set of segments into one of the first set of segments 308A or the second set of segments 308B based on the application of the first ML model 204A to each segment of the set of segments. Each segment of the first set of segments 308A corresponds to the streamable segment and each segment of the second set of segments 308B corresponds to the cacheable segment. Details about the classification of the set of segments operations are provided, for example, in FIG. 3.

At 906 of FIG. 9A, applying, in the first time interval, the second ML model 204B. In various embodiments, the system 202 is configured to apply in the first time interval, a second ML model 204B of the set of ML models 204 on the second set of segments 308B. Details about the application of the second ML model operation are provided, for example, in FIG. 4.

At 908 of FIG. 9A, determining, in the first time interval, the set of cache refresh intervals is determined. In various embodiments, the system 202 is configured to determine in the first time interval, a set of cache refresh intervals associated with the second set of segments 308B based on the application of the second ML model 204B to the second set of segments 308B. Details about the determination of cache refresh intervals operation are provided, for example, in FIG. 4.

At 910 of FIG. 9A, obtaining, in the first time interval, the device data. In various embodiments, the system 202 is configured to obtain in the first time interval, the device data associated with each electronic device of the first set of electronic devices 206 and the second set of electronic devices 208 based on the determination of the set of cache refresh interval. Details about the device data obtainment operation are provided, for example, in FIG. 5.

At 912 of FIG. 9B, configuring, in the first time interval, the CDN. In various embodiments, the system 202 is configured to obtain in the first time interval, the content delivery network (CDN) including the first set of electronic devices 206 and the second set of electronic devices 208 based on the obtained device data. Details about the CDN configuration operation are provided, for example, in FIG. 5.

At 914 of FIG. 9B, transmitting, in the first time interval, the second set of segments 308B. In various embodiments, the system 202 is configured to transmit in the first time interval, the second set of segments 308B from the first set of electronic devices 206 to the second set of electronic devices 208 based on the configuration of the CDN. Details about the second set of segments transmission operation are provided, for example, in FIG. 5.

At 916 of FIG. 9B, controlling, in the first time interval, the storage of each segment of the second set of segments. In various embodiments, the system 202 is configured to control in the first time interval, the second set of electronic devices 208 to store each segment of the transmitted second set of segments 308B. Details about the storage of the second set of segments 308B are provided, for example, in FIG. 5.

At 918 of FIG. 9B, controlling, in the second time interval, the obtainment of the first set of segments 308A by the second set of electronic devices 208. In various embodiments, the system 202 is configured to control the second set of electronic devices 208 to obtain the first set of segments 308A from the first set of electronic devices 206. The second time interval is subsequent to the first time interval. Details about the controlling of the second set of electronic devices 208 to obtain the first set of segments operation are provided, for example, in FIG. 6 and FIG. 7.

At 920 of FIG. 9B, controlling, in the second time interval, the aggregation of the obtained first set of segments 308A with the stored second set of segments 308B by the second set of electronic devices 208. In various embodiments, the system 202 is configured to control in the first time interval, the second set of electronic devices 208 to aggregate the obtained first set of segments 308A with the stored second set of segments 308B based on the application of the third ML model 204C to the obtained first set of segments 308A and the second set of segments 308B. Details about the aggregation of the obtained first set of segments with the stored second set of segments operation are provided, for example, in FIG. 6 and FIG. 7.

At 922 of FIG. 9B, generating, in the second time interval, the aggregated content 206B. In various embodiments, the system 202 is configured to generate in the second time interval, the aggregated content 206B based on the aggregation of the obtained first set of segments 308A with the stored second set of segments 308B. Details about the generation of the aggregated content operation are provided, for example, in FIG. 6 and FIG. 7.

At 924 of FIG. 9B, controlling, in the second time interval, the outputting of the aggregated content 206B by the second set of electronic devices 208. In various embodiments, the system 202 is configured to control in the second time interval, the second set of electronic devices 208 to output the aggregated content 206B. Details about aggregated content output operation are provided, for example, in FIG. 6 and FIG. 7.

While the above steps shown in FIG. 9A and FIG. 9B are described in a particular sequence, the steps may occur in variations to the sequence in accordance with various embodiments of the present disclosure. Further, details related to various steps of FIG. 9A and FIG. 9B, which are already covered in the description related to FIG. 1, FIG. 2, FIG. 3, FIG. 4, FIG. 5, FIG. 6, FIG. 7, FIG. 8A, and FIG. 8B, are not discussed again in detail here for the sake of brevity.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

applying, by a computer in a first time interval, a first machine learning (ML) model of a set of ML models on each segment of a set of segments of media content, wherein the media content is associated with a first set of electronic devices;

classifying, by the computer in the first time interval, each segment of the set of segments into one of a first set of segments or a second set of segments based on the applying of the first ML model to each segment of the set of segments, wherein each segment of the first set of segments corresponds to a streamable segment and each segment of the second set of segments corresponds to a cacheable segment;

applying, by the computer in the first time interval, a second ML model of the set of ML models on the second set of segments;

determining, by the computer in the first time interval, a set of cache refresh intervals associated with the second set of segments based on the applying of the second ML model to the second set of segments;

storing, by the computer in the first time interval, each segment of the second set of segments on a second set of electronic devices based on the determined set of cache refresh intervals, wherein the second set of electronic devices is different from the first set of electronic devices;

controlling, by the computer in a second time interval, the second set of electronic devices to obtain the first set of segments from the first set of electronic devices, wherein the second time interval is subsequent to the first time interval;

controlling, by the computer in the second time interval, the second set of electronic devices to aggregate the obtained first set of segments with the second set of segments based on an application of a third ML model to the obtained first set of segments and the second set of segments;

generating, by the computer, aggregated content based on the aggregating of the obtained first set of segments with the second set of segments; and controlling, by the computer in the second time interval, the second set of electronic devices to output the aggregated content.

2. The computer-implemented method of claim 1, further comprising:

obtaining, by the computer in the first time interval, the media content from the first set of electronic devices; and extracting, by the computer in the first time interval, the set of segments from the media content.

3. The computer-implemented method of claim 1, wherein the media content corresponds to one of a volumetric video, a three-dimensional (3D) video, or a two-dimensional (2D) video, and wherein each electronic device of the first set of electronic devices corresponds to an origin server.

4. The computer-implemented method of claim 1, further comprising:

receiving, by the computer in the first time interval, user engagement data associated with the media content;

applying, by the computer in the first time interval, the first ML model to each segment of the set of segments and the user engagement data; and classifying, by the computer in the first time interval, each segment of the set of segments into one of the first set of segments or the second set of segments based on the applying of the first ML model to each segment of the set of segments and the user engagement data, wherein each segment of the set of segments is classified, in accordance with a rate of temporal changes, in the media content of a respective segment of the set of segments.

5. The computer-implemented method of claim 1, wherein the first ML model comprises a convolutional neural network (CNN) model, and a long short-term memory (LSTM) model.

6. The computer-implemented method of claim 1, wherein the second ML model corresponds to a deep-Q network (DQN), and wherein the second ML model is trained on historical user engagement data associated with the media content or historical media content.

7. The computer-implemented method of claim 1, further comprising:

transmitting, by the computer in the first time interval, the second set of segments to the second set of electronic devices based on the set of cache refresh intervals, wherein each segment of the second set of segments is stored on at least one electronic device of the second set of electronic devices, for a respective cache refresh interval of the set of cache refresh intervals.

8. The computer-implemented method of claim 1, further comprising:

obtaining, by the computer in the first time interval, device data associated with each electronic device of the first set of electronic devices and the second set of electronic devices;

configuring, by the computer in the first time interval, a content delivery network (CDN) comprising the first set of electronic devices and the second set of electronic devices based on the device data; and transmitting, by the computer in the first time interval, the second set of segments from the first set of electronic devices to the second set of electronic devices based on the configuring of the CDN.

9. The computer-implemented method of claim 8, further comprising:

applying, by the computer in the first time interval, a fourth ML model of the set of ML models on the device data, wherein the fourth ML model is a graph neural network (GNN) based model; and configuring, by the computer in the first time interval, the CDN based on the applying of the fourth ML model to the device data.

10. The computer-implemented method of claim 9, wherein each electronic device of the second set of electronic devices corresponds to an edge server of the CDN.

11. The computer-implemented method of claim 10, further comprising:

controlling, by the computer in the second time interval, the second set of electronic devices to output the aggregated content, wherein the output of the aggregated content corresponds to a storage of the aggregated content on the edge server of the CDN.

12. The computer-implemented method of claim 1, wherein each electronic device of the second set of electronic devices corresponds to an end-user device associated with an end-user.

13. The computer-implemented method of claim 12, further comprising:

controlling, by the computer in the second time interval, the second set of electronic devices to output the aggregated content, wherein the output of the aggregated content corresponds to a rendering of the aggregated content on the end-user device.

14. The computer-implemented method of claim 1, wherein the third ML model corresponds to a generative adversarial network (GAN).

15. The computer-implemented method of claim 11, wherein a cache refresh interval from the set of cache refresh intervals associated with a corresponding segment of the second set of segments corresponds to a time period after which the corresponding segment is updated on an electronic device from the second set of electronic devices.

16. A computer system, comprising:

a processor set;

one or more computer-readable storage media; and program instructions stored on the one or more computer-readable storage media, the program instructions executable by the processor set to cause the processor set to:

apply, in a first time interval, a first machine learning (ML) model of a set of ML models on each segment of a set of segments of media content, wherein the media content is associated with a first set of electronic devices;

classify, in the first time interval, each segment of the set of segments into one of a first set of segments or a second set of segments based on the application of the first ML model to each segment of the set of segments, wherein each segment of the first set of segments corresponds to a streamable segment and each segment of the second set of segments corresponds to a cacheable segment;

apply, in the first time interval, a second ML model of the set of ML models on the second set of segments;

determine, in the first time interval, a set of cache refresh intervals associated with the second set of segments based on the application of the second ML model to the second set of segments;

obtain, in the first time interval, device data associated with each electronic device of the first set of electronic devices and a second set of electronic devices based on the determination of the set of cache refresh intervals, wherein the second set of electronic devices is different from the first set of electronic devices;

configure, in the first time interval, a content delivery network (CDN) comprising the first set of electronic devices and the second set of electronic devices based on the obtained device data;

transmit, in the first time interval, the second set of segments from the first set of electronic devices to the second set of electronic devices based on the configuration of the CDN;

control, in the first time interval, the second set of electronic devices to store each segment of the transmitted second set of segments;

control, in a second time interval, the second set of electronic devices to obtain the first set of segments from the first set of electronic devices, wherein the second time interval is subsequent to the first time interval;

control, in the second time interval, the second set of electronic devices to aggregate the obtained first set of segments with the stored second set of segments based on an application of a third ML model to the obtained first set of segments and the stored second set of segments;

generate, in the second time interval, aggregated content based on the aggregation of the obtained first set of segments with the stored second set of segments; and control, in the second time interval, the second set of electronic devices to output the aggregated content.

17. The computer system of claim 16, wherein the program instructions further cause the processor set to:

receive, in the first time interval, user engagement data associated with the media content;

apply, in the first time interval, the first ML model to each segment of the set of segments and the user engagement data; and classify, in the first time interval, each segment of the set of segments into one of the first set of segments or the second set of segments based on the application of the first ML model to each segment of the set of segments and the user engagement data, wherein each segment of the set of segments is classified, in accordance with a rate of temporal changes, in the media content of a respective segment of the set of segments.

18. The computer system of claim 16, wherein the program instructions further cause the processor set to:

transmit, in the first time interval, the second set of segments to the second set of electronic devices based on the determination of the set of cache refresh intervals, wherein each segment of the second set of segments is stored on at least one electronic device of the second set of electronic devices, for a respective cache refresh interval of the set of cache refresh intervals.

19. The computer system of claim 16, wherein the program instructions further cause the processor set to:

control, in the second time interval, the second set of electronic devices to output the aggregated content, wherein the output of the aggregated content corresponds to a storage of the aggregated content on an edge server of the CDN.

20. A computer-program product for classification and management of media content, the computer-program product comprising:

one or more computer-readable storage media; and program instructions stored on the one or more computer-readable storage media to perform operations comprising:

applying in a first time interval, a first machine learning (ML) model of a set of ML models on each segment of a set of segments of the media content, wherein the media content is associated with a first set of electronic devices;

classifying in the first time interval, each segment of the set of segments into one of a first set of segments or a second set of segments based on the application of the first ML model to each segment of the set of segments, wherein each segment of the first set of segments corresponds to a streamable segment and each segment of the second set of segments corresponds to a cacheable segment;

applying in the first time interval, a second ML model of the set of ML models to the second set of segments;

determining in the first time interval, a set of cache refresh intervals associated with the second set of segments based on the application of the second ML model to the second set of segments;

storing in the first time interval, each segment of the second set of segments on a second set of electronic devices based on the determined set of cache refresh intervals, wherein the second set of electronic devices is different from the first set of electronic devices;

controlling in a second time interval, the second set of electronic devices to obtain the first set of segments from the first set of electronic devices, wherein the second time interval is subsequent to the first time interval;

controlling in the second time interval, the second set of electronic devices to aggregate the obtained first set of segments with the second set of segments based on an application of a third ML model to the obtained first set of segments and the second set of segments;

generating in the second time interval an aggregated content based on the aggregation of the obtained first set of segments with the second set of segments; and controlling in the second time interval, the second set of electronic devices to output the aggregated content.

* * * * *